US012224474B2

(12) United States Patent
Semnani et al.

(10) Patent No.: US 12,224,474 B2
(45) Date of Patent: Feb. 11, 2025

(54) POWER-EFFICIENT MICROWAVE PLASMA JET BASED ON EVANESCENT-MODE CAVITY TECHNOLOGY

(71) Applicant: The University of Toledo, Toledo, OH (US)

(72) Inventors: Abbas Semnani, Toledo, OH (US); Kazi Sadman Kabir, Toledo, OH (US)

(73) Assignee: The University of Toledo, Toledo, OH (US)

( * ) Notice: Subject to any disclaimer, the term of this patent is extended or adjusted under 35 U.S.C. 154(b) by 308 days.

(21) Appl. No.: 18/075,523

(22) Filed: Dec. 6, 2022

(65) Prior Publication Data

US 2023/0178868 A1 Jun. 8, 2023

Related U.S. Application Data

(60) Provisional application No. 63/286,710, filed on Dec. 7, 2021.

(51) Int. Cl.
*H01P 1/219* (2006.01)
*H01P 7/06* (2006.01)
*H01P 11/00* (2006.01)

(52) U.S. Cl.
CPC ................ *H01P 1/219* (2013.01); *H01P 7/06* (2013.01); *H01P 11/007* (2013.01)

(58) Field of Classification Search
CPC .......... H01P 11/007; H01P 7/065; H01P 7/04; H01P 1/219; H01P 7/06
See application file for complete search history.

(56) References Cited

U.S. PATENT DOCUMENTS 5,961,772 A * 10/1999 Selwyn ............. H01J 37/32366 156/345.43
7,442,271 B2 10/2008 Asmussen et al.
8,884,725 B2 11/2014 Stephanou et al.
9,178,256 B2 11/2015 Stephanou et al.
9,831,066 B1 11/2017 Kamarehi et al.
10,319,480 B2 6/2019 Wong
10,674,594 B2 6/2020 Watson
2004/0107796 A1* 6/2004 Kumar .................... C22B 9/226 75/10.19
2005/0249324 A1 11/2005 Meacham
2006/0065195 A1 3/2006 Nagatsu
2006/0175302 A1 8/2006 Kuo
(Continued)

FOREIGN PATENT DOCUMENTS

CN 112996209 A * 6/2021
JP 5891341 B2 3/2016
(Continued)

OTHER PUBLICATIONS

Kolb et al., "Cold DC-Operated Air Plasma Jet for the Inactivation of Infectious Microorganisms", IEE Transactions on Plasma Science, 2012, vol. 40, Issue 11, pp. 1-20.
(Continued)

*Primary Examiner* — Quan Tra
(74) *Attorney, Agent, or Firm* — MacMillan, Sobanski & Todd, LLC

(57) ABSTRACT

Plasma jet assemblies utilizing evanescent mode cavity resonators, and methods of making the same and using the same, are described.

20 Claims, 30 Drawing Sheets
(28 of 30 Drawing Sheet(s) Filed in Color)

(56) References Cited

U.S. PATENT DOCUMENTS

| | | | | |
|---|---|---|---|---|
| 2010/0052539 | A1* | 3/2010 | Choi | H01J 37/32211 315/111.21 |
| 2015/0373824 | A1 | 12/2015 | Nettesheim et al. | |
| 2016/0217979 | A1 | 7/2016 | Kim et al. | |
| 2017/0318654 | A1 | 11/2017 | Nikic | |
| 2018/0322962 | A1 | 11/2018 | Wong | |
| 2018/0322963 | A1 | 11/2018 | Wong | |
| 2018/0330829 | A1 | 11/2018 | Wong | |
| 2023/0184232 | A1 | 6/2023 | Ziemba et al. | |

FOREIGN PATENT DOCUMENTS

| | | | |
|---|---|---|---|
| RU | 2169854 | C2 | 6/2001 |
| WO | 9835379 | | 8/1998 |
| WO | 2015030191 | A1 | 3/2015 |

OTHER PUBLICATIONS

Mohamed et al., "Low temperature, atmospheric pressure, direct current microplasma jet operated in air, nitrogen and oxygen", The European Physical Journal D, 2010, vol. 60, pp. 517-522.

Semnani et al., "Power Limiting Characteristics of a Plasma-Loaded Evanescent-Mode Cavity Resonator", Proceeding of the 46th European Microwave Conference, 2016, pp. 627-630.

Kolb et al., "Cold atmospheric pressure air plasma jet for medical applications", Applied Physics Letters, 2008, vol. 92; Retrieved from the Internet Dec. 13, 2022; Retrieved from URL https://doi.org/10.1063/1.2940325.

Sawada et al., "Pretreatment of Blind Via Holes before Ni/Au and Cu Plating Applied with Atmospheric Pressure Plasma Jet", Journal of Microelectronics & Electronic Packaging, 2005, vol. 2, Issue 3, pp. 189-196.

Hemawan et al., "Compact microwave re-entrant cavity applicator for plasma-assisted combustion", Review of Scientific Instruments, 2009, vol. 80, No. 5, pp. 1-10.

Rao et al., "Plasma Enhanced Combustion using Microwave Energy Coupling in a Re-entrant Cavity Applicator", 48th AIA A Aerospace Sciences Meeting Including the New Horizons Forum and Aerospace Exposition, 2010, Retrieved from the Internet Dec. 13, 2022, Abstract Only; Retrieved from URL: https://doi.org/10.2514/6.2010-651.

Klute et al., "Theoretical investigation of a miniature microwave driven plasma jet", Plasma Sources Science and Technology, 2020, pp. 1-24.

Xia et al., "Longer Microwave Plasma Jet With Different Discharge Performances Originated by Plasma-Surface Interactions", IEE Transactions on Plasma Science, 2014, vol. 42, No. 10, pp. 2768-2769.

Fu et al., "A high efficiency low-temperature microwave-driven atmospheric pressure plasma jet", Applied Physics Letters 114, 2019, pp. 254106-254106-4.

Hamdan et al., "Microwave Plasma Jet in Water: Characterization and Feasibility to Wastewater Treatment", Plasma Chemistry and Plasma Processing, 2018, vol. 38, No. 3, pp. 1-26.

* cited by examiner

POWER-EFFICIENT MICROWAVE PLASMA JET BASED ON EVANESCENT-MODE CAVITY TECHNOLOGY

RELATED APPLICATIONS

This application claims priority to U.S. Provisional Application No. 63/286,710, filed under 35 U.S.C. § 111(b) on Dec. 7, 2021, the disclosure of which is incorporated herein by reference in its entirety for all purposes.

STATEMENT REGARDING FEDERALLY SPONSORED RESEARCH

This invention was made with no government support. The government has no rights in this invention.

BACKGROUND

Cold plasma is a critical technology in many application fields, including microelectronic fabrication, plasma medicine, flow control, lighting, propulsion, and sterilization. However, generating stable plasma is not a trivial task as energy-hungry machines are often required. Currently, igniting and sustaining plasma is usually performed by using either high-voltage pulses (e.g., 100s of V to kV) or high-power radio frequency (RF) sources (e.g., 10s of W). Therefore, even though low-power plasma with effective surface power density on the order of 0.1 to 1 W/cm$^2$ is sufficient for many applications, including some medical ones, most current plasma sources are bulky and expensive units as they are inefficient in transferring energy to the plasma. Hence, efficient plasma with low power consumption would impact a wide range of applications such as plasma medicine, food and water decontamination, lighting, and reconfigurable RF electronics.

Although DC, pulse, and RF plasmas have been extensively explored, there is no comprehensive understanding of microwave plasma. This is despite the fact that microwave plasma occurs in the $\alpha$-discharge regime with an extremely low sheath voltage drop, ensuring that the ignited plasma is stable with no electrode erosion as an important lifetime issue. Also, higher degrees of ionization and dissociation, higher densities of electrons and reactive species, lower heavy particle temperatures, and lower breakdown voltage are other advantages of microwave plasma compared to other types of electrically excited plasma. Non-resonant microwave plasma sources, however, are also realized by employing bulky and high-power supplies. In addition, they come at a prohibitively high cost except for high-end applications. Moreover, the resulting high voltages reduce power efficiency, require cumbersome safety protocols, and create a poor environment from an electromagnetic (EM) compatibility perspective.

Due to their ability to store and enhance EM energy, it is possible to employ microwave resonant structures to achieve high-efficiency plasma with low power consumption. The main principle is to utilize resonators that can concentrate the electromagnetic fields over a small gap. In this case, even with considerably low levels of input power, the magnitude of EM fields over those critical gaps can reach the breakdown threshold, resulting in gas breakdown and plasma formation. Since the effective size of the gap decreases after plasma formation, the required amount of power for sustaining plasma is usually even less. Before plasma ignition, the unloaded resonator produces strong fields necessary for gas breakdown. The higher the quality factor of the resonator, the higher the field enhancement. After ignition, however, the plasma impedance interacts with the resonator, quenching the resonator's quality factor. Thus, resonant structures also operate as so-called "ballasts" to avoid plasma instability, such as the glow-to-arc transition and streamer formation.

Different microwave resonant structures (e.g., quarter/half wavelength, ring, and dielectric) implemented using various technologies (microstrip, stripline, coplanar waveguide, coaxial, etc.) have been successfully examined for low-power plasma creation. However, (1) most of them do not operate in atmospheric pressure, which makes them difficult to be implemented in many practical scenarios, (2) the ignited plasma region is typically confined to a minimal volume and, hence, not optimal for many applications, and (3) it is impractical in most of the cases to scale up the resonant designs to larger effective areas.

In sum, plasma jets have many applications, such as in the biomedical field, or for plasma propulsion or plasma processing. Most plasma jets employ either RF or pulse excitation. However, these devices are typically not efficient, energy hungry, bulky, heavy, and expensive. Also, because of the high power/voltage involved, safety is a big concern. There are other microwave plasma jets, in both resonant and non-resonant modes, but still typically require high power consumption. Accordingly, there remains a need in the art for new and improved plasma jets.

SUMMARY

Provided is a plasma jet assembly comprising a cavity resonator; a metallic material disposed in the cavity resonator; a radio frequency port configured to receive a radio frequency connector configured to couple electromagnetic energy into the cavity resonator; and a gas channel within the metallic material and configured to direct a flow of a gas (i) to a space adjacent the metallic material where an electric field concentrates upon the coupling of electromagnetic energy from the radio frequency connector, and (ii) in a direction out of the plasma jet assembly.

In certain embodiments, the cavity resonator is defined by an outer perimeter of via-holes formed in a printed circuit board. In particular embodiments, the metallic material is defined by an inner perimeter of via-holes formed in the printed circuit board within the outer perimeter of via-holes. In particular embodiments, the gas channel is defined by a central via-hole formed in the printed circuit board within the inner perimeter of via-holes. In particular embodiments, an input coupling line of the radio frequency port is disposed adjacent to the inner perimeter of via-holes without touching the inner perimeter of via-holes.

In certain embodiments, the cavity resonator is defined by a base surface and cavity walls of a main body.

In certain embodiments, the metallic material is a metallic post.

In certain embodiments, the radio frequency connector has a radio frequency pin disposed adjacent to the metallic post without touching the metallic post.

In certain embodiments, the plasma jet assembly further comprises a ceiling assembly having an inner surface and an outer surface, the inner surface disposed over the cavity resonator, and the ceiling assembly defining a plasma jet outlet. In particular embodiments, the space is formed between the metallic post and the ceiling assembly. In particular embodiments, the space is defined by a recess formed in the inner surface of the ceiling assembly.

Further provided is a plasma jet assembly comprising a printed circuit board comprising a cavity resonator defined by an outer perimeter of via-holes formed in the printed circuit board; an inner perimeter of via-holes formed in the printed circuit board within the outer perimeter of via-holes; a radio frequency port configured to receive a radio frequency connector configured to couple electromagnetic energy into the cavity resonator; a central via-hole formed in the printed circuit board and within the inner perimeter of via holes, the central via-hole configured to direct a flow of a gas (i) to a space adjacent the inner perimeter of via-holes where an electric field concentrates upon the coupling of electromagnetic energy from the radio frequency connector, and (ii) in a direction through the central via-hole and out of the plasma jet assembly.

In certain embodiments, the printed circuit board comprises a first circuit layer and a second circuit layer with a substrate layer between the first circuit layer and the second circuit layer.

In certain embodiments, the substrate layer is composed of a sandwich of two substrate layers.

In certain embodiments, an input line of the radio frequency port is disposed adjacent to the inner perimeter of via-holes without touching the inner perimeter of via-holes.

In certain embodiments, the radio frequency port is disposed adjacent to the substrate layer.

Further provided is a plasma jet assembly comprising a cavity resonator defined by a base surface and cavity walls; a ceiling assembly having an inner surface and an outer surface, the inner surface disposed over the cavity resonator; a metallic post disposed in the cavity resonator; a radio frequency port configured to receive a radio frequency connector configured to couple electromagnetic energy into the cavity resonator; a space formed between the metallic post and the ceiling assembly; a plasma jet outlet defined by the ceiling assembly; and a gas channel within the metallic post and configured to direct a flow of a gas (i) to the space where an electric field concentrates upon the coupling of electromagnetic energy from the radio frequency connector, and (ii) in a direction through the plasma jet outlet and out of the plasma jet assembly.

In certain embodiments, the space is defined by a recess formed in the inner surface of the ceiling assembly.

In certain embodiments, the radio frequency connector has a radio frequency pin disposed adjacent to the metallic post without touching the metallic post.

In certain embodiments, the metallic post is axially aligned with the gas channel.

Further provided is a plasma jet assembly comprising a cavity resonator, a metallic post disposed in the cavity resonator, a radio frequency port configured to receive a radio frequency connector configured to couple electromagnetic energy into the cavity resonator, and a gas channel within the metallic post and configured to direct flow of a gas (i) to a space adjacent the metallic post where an electric field concentrates upon the coupling of electromagnetic energy from the radio frequency connector, and (ii) in a direction out of the plasma jet assembly.

In certain embodiments, the cavity resonator and the metallic post are housed within a main body, and the radio frequency connector is configured to couple electromagnetic energy from an RF source external to the main body.

In particular embodiments, the main body comprises a ceiling assembly defining a plasma jet outlet axially aligned with the metallic post. In particular embodiments, the ceiling assembly is removable. In particular embodiments, the ceiling assembly includes a recess configured to cover or partially cover the cavity resonator. In particular embodiments, the ceiling assembly defines a plasma jet outlet. In particular embodiments, the metallic post extends from a first end at a base surface within the cavity resonator to a second end adjacent to the ceiling assembly, wherein a gap is defined between the second end of the metallic post and the ceiling assembly, the gap being the space where the electric field concentrates upon the coupling of electromagnetic energy from the radio frequency connector.

In particular embodiments, the main body comprises a base surface surrounded by cavity walls. In particular embodiments, the metallic post is disposed centrally on the base surface.

In particular embodiments, the ceiling assembly includes an outer surface having the plasma jet outlet formed therein. In particular embodiments, the ceiling assembly includes an inner surface having a recess formed therein.

In particular embodiments, the gas channel has a first channel opening and a second channel opening, the first channel opening being at the second end of the metallic post, and the second channel opening being either at the first end of the metallic post or outside the main body.

In certain embodiments, the plasma jet assembly further comprises a gas transport tube disposed through the gas channel. In particular embodiments, the gas transport tube is a capillary tube.

In certain embodiments, the plasma jet assembly further comprises a radio frequency connector disposed through the radio frequency port. In particular embodiments, where the radio frequency connector has a radio frequency pin disposed adjacent to the metallic post without touching the metallic post. In particular embodiments, the radio frequency connector includes a coaxial cable.

In certain embodiments, the cavity resonator has a circular cross section.

In certain embodiments, the metallic post is axially aligned with the gas channel.

In certain embodiments, the plasma jet assembly comprises a printed circuit board having a first circuit layer and a second circuit layer with a substrate layer between the first circuit layer and the second circuit layer. In particular embodiments, the substrate layer is composed of two sandwiched substrate layers. In particular embodiments, the cavity resonator comprises an outer perimeter of via-holes in the printed circuit board. In particular embodiments, the metallic post comprises an inner perimeter of via-holes in the printed circuit board within the outer perimeter. In particular embodiments, the gas channel comprises a central via-hole within the inner perimeter. In particular embodiments, the plasma jet assembly further comprises a radio frequency connector disposed through the radio frequency port. In particular embodiments, the plasma jet assembly further comprises a radio frequency connector that transfers energy into the cavity resonator. In particular embodiments, the radio frequency connector includes a coaxial cable. In particular embodiments, the radio frequency port is disposed adjacent to the substrate layer.

Further provided is a method of using a plasma jet assembly described herein, the method comprising connecting a radio frequency connector to a signal generator and the radio frequency port; flowing a gas from a gas source into the gas channel; and activating the signal generator to couple electromagnetic energy into the cavity resonator and produce a jet of plasma out of the plasma jet assembly. In certain embodiments, the method further comprises disposing a gas transport tube in the gas channel. In certain embodiments, an electric field on the order of $10^5$ V/m is generated in the space with an input power of milliwatts.

Further provided is a method of using a plasma jet assembly described herein, the method comprising connecting a radio frequency connector to a signal generator and the radio frequency port; flowing a gas from a gas source into the central via-hole; and activating the signal generator to couple electromagnetic energy into the cavity resonator and produce a jet of plasma out of the central via-hole.

Further provided is a plasma jet assembly comprising a first substrate; a second substrate disposed over the first substrate; an outer perimeter of via-holes formed through the first substrate and the second substrate; a cavity resonator formed within the outer perimeter of via-holes; an inner perimeter of via-holes formed through the first substrate and within the outer perimeter of via-holes; a radio frequency port disposed adjacent to the first substrate and the second substrate, the radio frequency port configured to receive a radio frequency connector configured to couple electromagnetic energy into the cavity resonator; and a central via-hole formed through the first substrate and the second substrate and within the inner perimeter of via-holes, the central via-hole configured to direct a flow of a gas (i) to a space within the inner perimeter of via-holes where an electric field concentrates upon the coupling of electromagnetic energy from the radio frequency connector, and (ii) in a direction through the central via-hole and out of the plasma jet assembly.

In certain embodiments, the first substrate comprises a top side, a bottom side, and a first microwave laminate; and the second substrate comprises a top side, a bottom side, and a second microwave laminate.

In certain embodiments, the space includes a recess formed in the bottom side of the second substrate.

In certain embodiments, the first substrate comprises a plurality of coupling via-holes formed therethrough and extending from the RF port toward the cavity resonator.

In certain embodiments, a gas transport tube is disposed through the central via-hole.

Advantageously, a plasma jet assembly as described herein can have higher efficiency, lower energy consumption, a compact form factor, and higher safety when compared to conventional plasma jets. A plasma jet assembly as described herein can be desirably applied to a variety of different fields and technologies, such as, but not limited to, plasma medicine, food/water/agricultural decontamination, material processing, propulsion, antimicrobial treatments, reconfigurable RF electronics, and flow controls.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
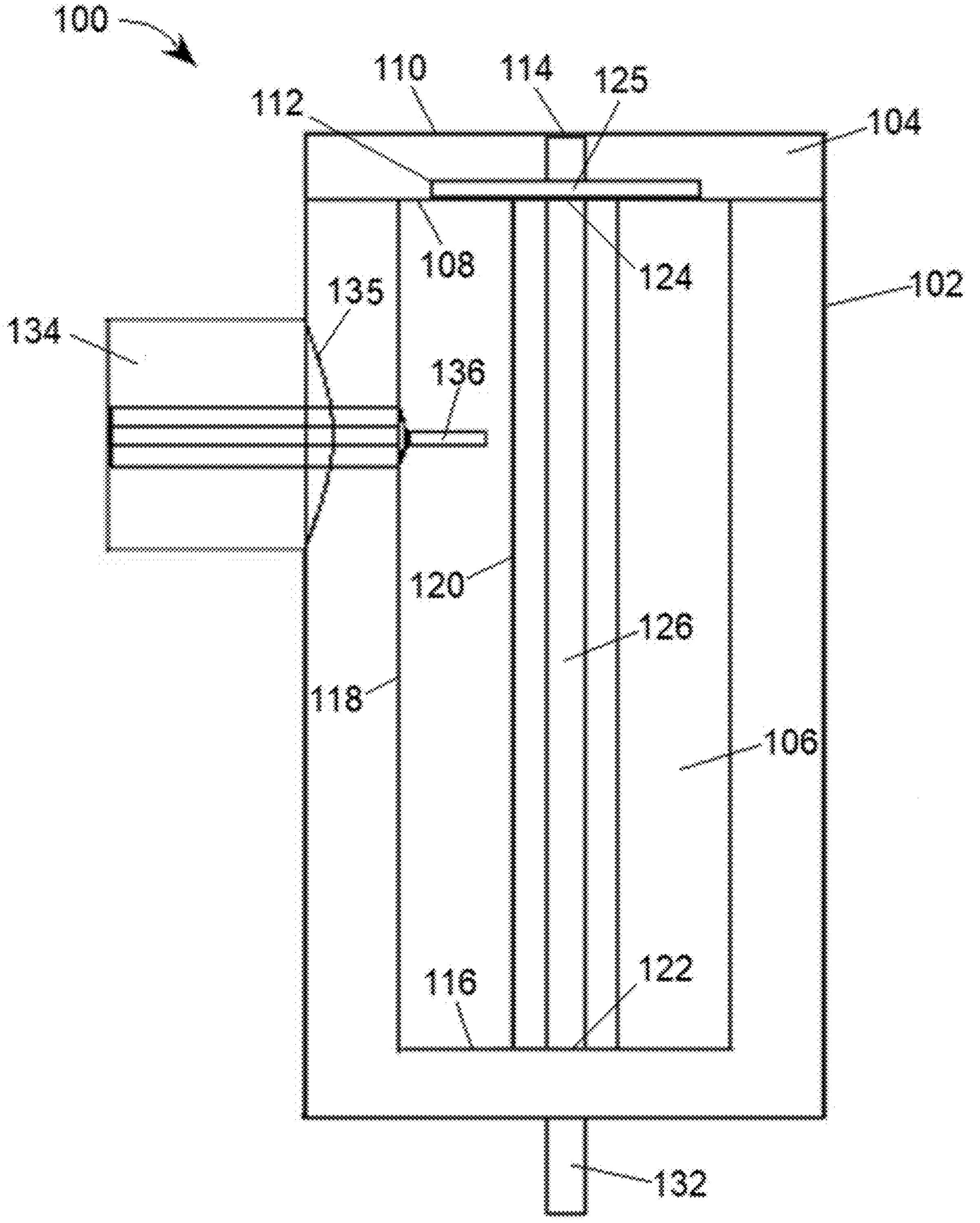
FIG. 1: Non-limiting example of a first embodiment of an evanescent mode cavity plasma jet assembly.

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

As used herein, the term "coupling" refers to the transfer of energy from one medium to another medium. Examples of coupling include, but are not limited to, direct coupling, resistive conduction, atmospheric plasma channel coupling, inductive coupling, capacitive coupling, evanescent wave coupling, radio waves, electromagnetic interference, and microwave power transmission.

As used herein, the terms "printed circuit board" and "PCB" refer to a medium to connect electronic components to one another in a controlled manner. The medium can include one or more layers, including, but not limited to, conductive layers, insulating layers, solder mask layers, and microwave laminates.

As used herein, the term "microwave laminate" can include substrates used for radio frequency (RF) and microwave communication systems and electronics. Generally, microwave laminates have a low dissipation factor, low levels of moisture absorption, and a low dielectric constant.

Provided herein is a plasma jet that utilizes microwave resonator technology. In some embodiments, the plasma jet can operate with different gas types (such as, but not limited to, helium or argon) and flow rates (for example, from 0.1 to a few slpm) with very high efficiency, which means extremely low power consumption. The resulting jet of plasma has a diameter that can be up to a couple of millimeters and a length up to ten millimeters, while both jet length and plasma properties can be controlled by input power and gas flow rate.

As described in the examples herein, non-limiting example plasma jets were designed, fabricated, and successfully measured at 2.45 GHz, which is a standard frequency for plasma applications. In a first example, the plasma jet was created with hundreds of milliwatts of input power and had a power efficiency of more than 80%. Compared to conventional plasma jets with pulse excitation, the plasma jet described herein has a much higher efficiency, and can operate in much lower power, and therefore is much safer, making the plasma jet useful and advantageous for many applications including, but not limited to, biomedical applications such as skin or dental treatments, disinfection (i.e., antimicrobial treatments), and cancer therapy. As also described in the examples herein, the average power consumption of the plasma jet can be even further decreased by using pulsed microwave excitation instead of continuous wave (CW). It is possible to utilize the same technique in lower frequencies (for example, 13.56 MHz or 26 MHz) to make high-efficiency plasma jets with higher plasma volume and thrust for other applications like plasma propulsion and material processing.

Referring now to FIG. 1, in a first embodiment, a plasma jet assembly 100 as provided herein includes a main body 102. The main body 102 has a ceiling assembly 104 disposed over a cavity resonator 106. In particular embodiments, the main body 102 has a circular cross section and is manufactured from copper. However, it should be appreciated that a skilled artisan can select other shapes and materials for the main body 102, within the scope of this disclosure. For example, in other embodiments, the main body 102 is made from a plastic or other polymer, with a metallic coating on the cavity walls 118, inner surface 108, and base surface 116, inside the cavity resonator 106.

Referring still to FIG. 1, the ceiling assembly 104 includes an inner surface 108 and an outer surface 110. In certain embodiments, ceiling assembly 104 is removable and the inner surface 108 of the ceiling assembly 104 includes a recess 112. The recess 112 is configured to cover or partially cover the cavity resonator 106. The outer surface 110 of the ceiling assembly 104 has a plasma jet outlet 114. The plasma jet outlet 114 is configured to emit a jet of plasma. It should be appreciated that one skilled in the art can select different configurations for the ceiling assembly 104, as desired.

Referring still to FIG. 1, the cavity resonator 106 is configured to be enclosed or mostly enclosed by the ceiling assembly 104 to confine electromagnetic fields inside the cavity resonator 106. The cavity resonator 106 has a base surface 116 surrounded by cavity walls 118. The cavity walls 118 are configured to reflect electromagnetic waves back and forth between the cavity walls 118. In certain embodiments, the base surface 116 is disposed opposite to the ceiling assembly 104. The cavity resonator 106 includes a metallic material, for example a metallic post 120, extending through the cavity resonator 106 from a first end 122 at the base surface 116 to a second end 124 at the ceiling assembly 104. The first end 122 of the metallic post 120 is disposed centrally on the base surface 116 of the cavity resonator 106. In some embodiments, the metallic post 120 is concentric with the base surface 116, and/or concentric with the cavity resonator 106. Advantageously, the metallic post 120 in combination with the cavity resonator 106 forms an evanescent-mode (EVA) cavity resonator 106, as described in more detail below. The second end 124 of the metallic post 120 is disposed adjacent to the ceiling assembly 104. A space or gap 125 is formed between the second end 124 of the metallic post 120 and the plasma jet outlet 114 of the ceiling assembly 104. In certain embodiments, the gap 125 is formed between the second end 124 of the metallic post 120 and the recess 112 of the ceiling assembly 104. In certain embodiments, the gap 125 is defined by the recess 112. The metallic post 120 may be manufactured from copper, however any other conductive materials may be used instead of, or in addition to, copper.

Referring still to FIG. 1, the metallic post 120 has a gas channel 126. The gas channel 126 may be formed through the entire length of the metallic post 120, the base surface 116 of the cavity resonator 106, and the main body 102. However, in some embodiments, the gas channel 126 does not extend through the entire length of the metallic post 120. The gas channel 126 may be axially aligned with the metallic post 120. The gas channel 126 may also be concentric with the metallic post 120, and/or concentric with the base surface 116, and/or concentric with the cavity resonator 106. However, in some embodiments, the gas channel 126 is not concentric with the metallic post 120, concentric with the base surface 116, or concentric with the cavity resonator 106.

Referring still to FIG. 1, the gas channel 126 has a first channel opening at the first end 122 of the metallic post 120 or at an outer surface of the main body 102. The gas channel 126 has a second channel opening at the second end 124 of the metallic post 120 or the plasma jet outlet 114. The gas channel 126 is configured to permit a gas from a gas source to pass through the cavity resonator 106 and into the gap 125 formed between the second end 124 of the metallic post 120 and the ceiling assembly 104, and to flow in the direction of the plasma jet outlet 114. Thus, the gas channel 126 may be axially aligned with the plasma jet outlet 114. In certain embodiments, a gas transport tube 132 is disposed in some or all of the gas channel 126 to transport the gas from the gas source to the gap 125. A non-limiting example of the gas transport tube 132 is a capillary tube. However, it should be appreciated that a person skilled in the art can employ different mechanisms for transporting the gas to the gap 125, within the scope of this disclosure. For example, it is not necessary for any tube to be disposed within the gas channel 126. Rather, the gas channel 126 may consist of a channel through the metallic post 120 without any structure therein.

Referring still to FIG. 1, the main body 102 may have an opening therein defining a radio frequency (RF) port 135. The RF port 135 is configured to receive a RF connector 134 having a RF pin 136 which may extend through the cavity wall 118 into the cavity resonator 106. The RF connector 134 may be disposed within, and may extend through, the RF port 135. Microwaves provide a unique means for efficiently transferring energy directly into the electron bonds in gas molecules. Microwave-excited plasmas introduce a higher density of electrons and reactive species, lower breakdown power, lower heavy particle temperatures, and lower discharge voltages compared to DC and RF plasmas. Thus, the RF connector 134 and the RF pin 136 can be configured to couple microwaves to the cavity resonator 106. However, the RF connector 134 is not limited to providing microwaves. Rather, any sufficient source of energy may be supplied to the cavity resonator 106 through the RF port 135 via the RF connector 134 and RF pin 136. The RF pin 136 may be in communication with a signal generator and disposed adjacent to the metallic post 120, without touching the metallic post 120. The RF pin 136 can be configured to provide a strong coupling of the input energy from the signal generator to the cavity resonator 106. In certain embodiments, the RF connector 134 includes a coaxial RF cable. Other equivalent or similar cables can also be employed for the RF connector 134, as desired. In some embodiments, the RF connector 134 is a SMA coaxial cable that feeds microwave energy from a signal generator into the cavity resonator 106. In one non-limiting example, a 2.45 GHz microwave signal generated by a signal generator is fed to the cavity resonator 106 after being amplified by a power amplifier.

Referring still to FIG. 1, in operation, the cavity walls 118 in combination with the metallic post 120 facilitate an electric field concentration in the gap 125 between the metallic post 120 and the ceiling assembly 104. With enough input power provided to the cavity resonator 106, via the RF connector 134, the high electric field concentration ionizes the gas funneling into the gap 125 from the gas channel 126 to produce a plasma jet (plasma plume). The plasma jet exits the main body 102 via the plasma jet outlet 114 due to the gas flowing from the gas channel 126 to the plasma jet outlet 114. The gas thus acts not only as the source of charged species to create plasma, but also as a carrier gas. Advantageously, the plasma jet assembly 100 has higher efficiency than conventional plasma jets, lower power consumption, and a very compact form factor.

Referring still to FIG. 1, a method of using the plasma jet assembly 100 may include connecting the RF pin 136 to a signal generator through the RF connector 134, disposing the gas transport tube 132 in the gas channel 126, connecting the gas transport tube 132 to a gas source, and activating the gas source and the signal generator to produce a plasma jet directed out of the plasma jet outlet 114 by the flow of gas. Further details regarding the structure and operation of the first embodiment of the plasma jet assembly 100 are described in the examples section.

Referring now to FIGS. 2, 13-14B, in a second embodiment, the plasma jet assembly 200 provided herein includes a printed circuit board (PCB) 202. In certain embodiments, the PCB 202 is a substrate integrated waveguide (SIW) PCB. However, other PCBs are possible and encompassed within the scope of the present disclosure. The PCB 202 may have a substrate layer 204 (which, in some embodiments, is composed of two sandwiched substrate layers), a first circuit layer 206, and a second circuit layer 208. The substrate layer 204 is disposed between the first circuit layer 206 and the second circuit layer 208. The plasma jet assembly 200 has a cavity 210 that is enclosed by the first circuit layer 206 and the second circuit layer 208. The substrate layer 204 can be manufactured from a variety of materials. Non-limiting examples include solid fiberglass and flexible polymers. In addition, the first circuit layer 206 and the second circuit layer 208 can be manufactured from a variety of conductive materials, such as, but not limited to, copper.

Figure 2:
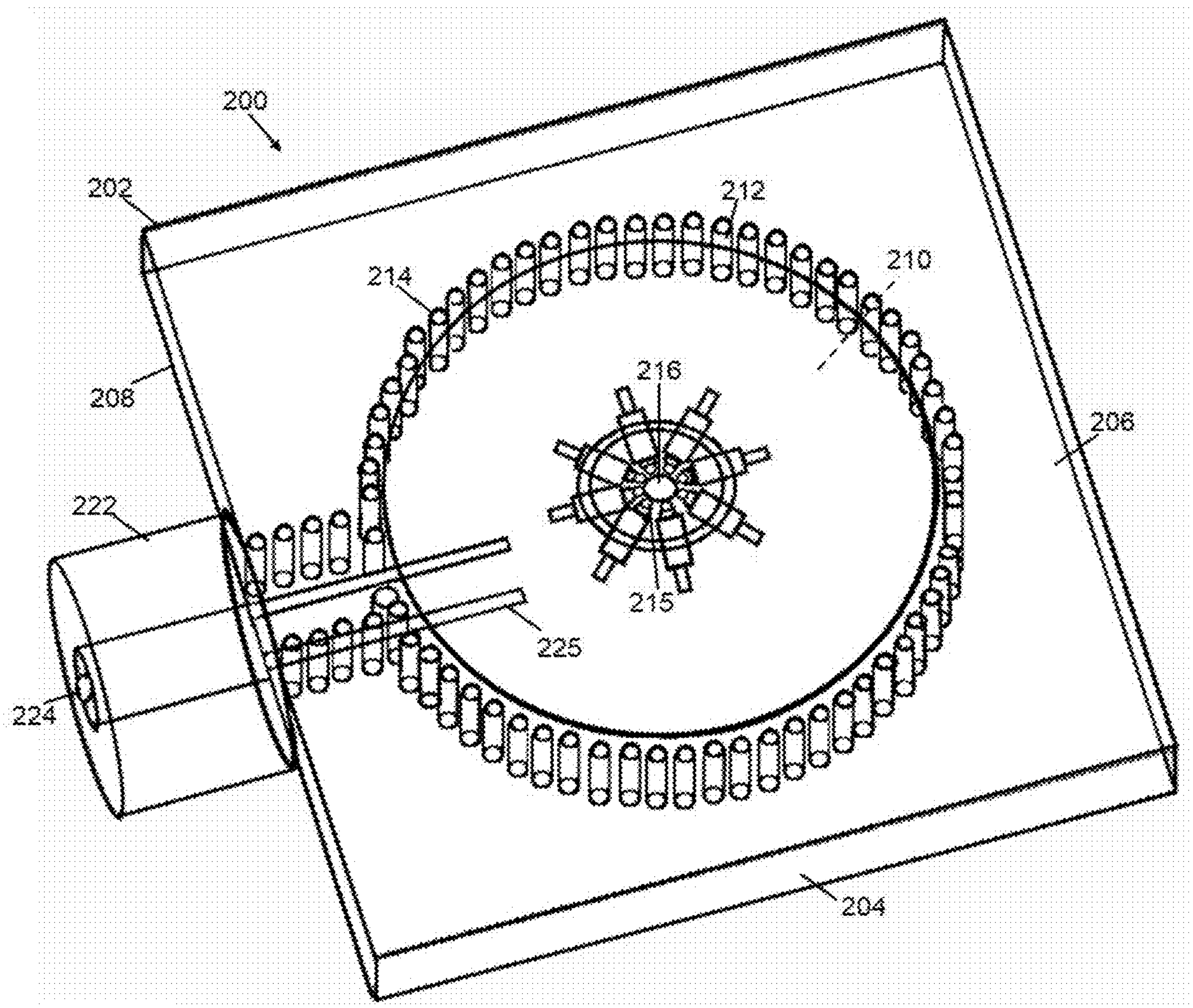
FIG. 2: Non-limiting example of a second embodiment of the evanescent mode cavity plasma jet assembly.

Referring to FIG. 2, the first circuit layer 206 includes a plurality of via-holes 212 arranged in an outer perimeter 214, an inner perimeter 215, and a central via-hole 216. Each of the via-holes 212 and/or the central via-hole 216 are formed through the first circuit layer 206, the substrate layer 204, and the second circuit layer 208. The via-holes 212 and/or the central via-hole 216 can be plated with a conductive material, such as copper, to form an electrical connection through the substrate layer 204 that separates the first circuit layer 206 and the second circuit layer 208. Other conductive materials can also be employed.

Referring still to FIG. 2, the outer perimeter 214 of via-holes 212 defines the boundary of the cavity 210 within the substrate layer 204. The outer perimeter 214 of via-holes 212 functions as the cavity walls 118 in the first embodiment of the plasma jet assembly 100 depicted in FIG. 1 and described above. That is, the outer perimeter 214 of via-holes 212 is capable of reflecting the electromagnetic waves back and forth between the via-holes 212 of the outer perimeter 214. The inner perimeter 215 of via-holes 212 is disposed within the outer perimeter 214 of via-holes 212. The inner perimeter 215 of via-holes 212 may be concentric with the outer perimeter 214 of via-holes 212. The inner perimeter 215 of via-holes 212 functions as the metallic post 120 in the first embodiment of the plasma jet assembly 100 depicted in FIG. 1 and described above. Desirably, this allows the cavity 210 of the substrate layer 204 to function as an evanescent-mode (EVA) cavity resonator 210.

Referring still to FIG. 2, the central via-hole 216 is disposed within the inner perimeter 215 of via-holes 212. The central via-hole 216 functions as the gas channel 126 in the first embodiment of the plasma jet assembly 100 depicted in FIG. 1 and described above. In particular, the central via-hole 216 has a first via opening and a second via opening. The first via opening is formed on the first circuit layer 206 and is configured to emit the jet of plasma. The second via opening is formed on the second circuit layer 208 and is configured to be in communication with a gas source. In certain embodiments, a gas transport tube is disposed through the central via-hole 216. The gas transport tube may be configured to transport a gas from a gas source to the first via opening of the central via-hole 216. A non-limiting example of the gas transport tube is a capillary tube. However, it should be appreciated that a skilled artisan can select different mechanisms for transporting the gas to the first via opening, as desired. For example, it is not necessary that the central via-hole 216 include any tube. The central via-hole 216 may be concentric with the outer perimeter 214 of via-holes 212 and/or the inner perimeter 215 of via-holes 212. Furthermore, the via-holes 212 of the outer perimeter 214, the inner perimeter 215, and/or the central via-hole 216 can be substituted with metallic posts.

Referring still to FIG. 2, the plasma jet assembly 200 also includes a RF port 222. The RF port 222 is configured to be in electrical communication with a RF connector 224. The RF port 222 can include one or more coupling input lines 225. In some non-limiting examples, the one or more coupling input lines 225 are disposed on the second circuit layer 208 and directly below at least a portion of the cavity 210. In other non-limiting examples, the one or more input coupling lines 225 are not directly below at least one of the one of the inner perimeters 214 of via-holes 212 and the central via-holes 216. The RF connector 224 may be in electrical communication with a signal generator and the RF port 222. In certain embodiments, the RF connector 224 and the PCB 202 form a coplanar waveguide (CPW) that transfers energy into the cavity 210 from the RF connector 224. The coplanar waveguide is configured to provide a strong coupling of the input energy from the signal generator to the cavity 210. In certain embodiments, the RF connector 224 includes a coaxial RF cable. However, other cables can also be employed instead of, or in addition to, a coaxial RF cable, within the scope of this disclosure.

In operation, the outer perimeter 214 of via-holes 212 in combination with the inner perimeter 215 of via-holes 212 facilitate an electric field concentration within the central via-hole 216. With enough input power to the cavity 210, via the RF cable, the high electric field concentration ionizes the gas funneling into the central via-hole 216 to produce the plasma jet (plasma plume). The plasma jet exits the PCB 202 via the first via opening of the central via-hole 216 due to the gas flowing in the direction of from the second circuit layer 208 to the first circuit layer 206 through the central via-hole 216. The gas thus acts not only as the source of ions to create plasma, but also as a carrier gas that directs the plasma is the direction of the gas flow which, in the embodiment depicted in FIG. 2, is in a direction generally orthogonal to the plane defined by the first circuit layer 206. Advantageously, the plasma jet assembly 200 has higher efficiency than conventional plasma jets, lower power consumption, and a very compact form factor.

A method of using the plasma jet assembly 200 may include connecting the RF connector 224 to the signal generator and the RF port 222, disposing the gas transport tube in the central via-hole 216, connecting a gas transport tube to a gas source, and activating the gas source and the signal generator to produce a jet of plasma out of the central via-hole 216 on the first circuit layer 206 side.

Referring now to FIGS. 20-27, in a non-limiting example of the second embodiment, the plasma jet assembly 300 includes a first substrate 302, a second substrate 303, an outer perimeter of via-holes 304, a cavity resonator 306, an inner perimeter of via-holes 308, a radio frequency (RF) port 310, and a central via-hole 312. In some non-limiting examples, the first substrate 302 and the second substrate 303 are two portions of one integral substrate.

Figure 24:
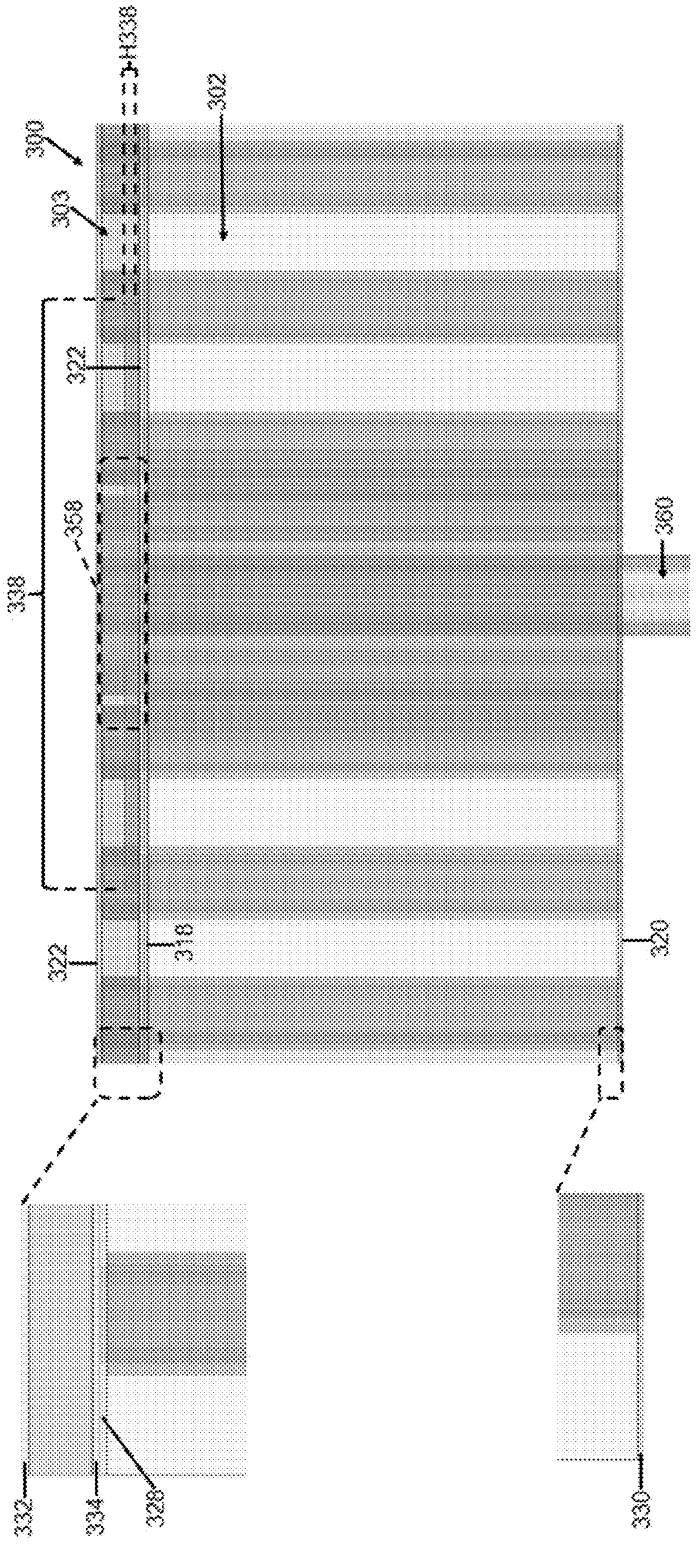
FIG. 24: Side elevational view of the non-limiting example second embodiment plasma jet assembly depicted in FIGS. 20-23, including enlarged views.

Referring to FIG. 24, the first substrate 302 includes a top side 318 and a bottom side 320. In certain embodiments, the first substrate 302 comprises a first microwave laminate. The first microwave laminate can form the entirety of the first substrate 302 or can be a layer applied to one or more surfaces of the first substrate 302. The second substrate 303 includes a top side 322 and a bottom side 324. The second substrate 303 comprises a second microwave laminate. The second microwave laminate can form the entirety of the second substrate 303 or can be a layer applied to one or more surfaces of the second substrate 303. The bottom side 324 of the second substrate 303 is disposed over the top side 318 of the first substrate 302. The bottom side 324 may be in direct contact with the top side 318, or one or more intervening layers or materials may be disposed between the bottom side 324 and the top side 318. In some non-limiting examples, the first microwave laminate directly contacts the second microwave laminate.

Examples of microwave laminates can include a variety of materials suitable for electromagnetic applications, including thermoset resins microwave laminates, ceramic microwave laminates, polytetrafluoroethylene (PTFE) microwave laminates, polymer microwave laminates, or combinations thereof, including composites. In addition, one or more of the top sides 318, 322 and the bottom sides 320, 324 of the substrates 302, 303 can include cladding, such as copper cladding. In certain embodiments, the first substrate 302 has a first top cladding 328 and a first bottom cladding 330, as shown in FIG. 24. In certain embodiments, the second substrate 303 has a second top cladding 332 and a second bottom cladding 334, as shown in FIG. 24. Desirably, the cladding 328, 330, 332, 334 can assist in preventing or militating against the asymmetric spread of the electric field.

In certain embodiments, the first microwave laminate comprises a ceramic thermoset polymer composite, such as, but not limited to, the TMM® 10i laminates sold by the Rogers Corporation. In certain embodiments, the dielectric constant of the first microwave laminate is about 9.80 and the dissipation factor of the first microwave laminate is about 0.0020. A height of the first microwave laminate can be about 0.508 mm, as a non-limiting example. In certain embodiments, the second microwave laminate comprises a ceramic thermoset polymer composite, such as, but not limited to, the TMM® 3 laminates sold by the Rogers Corporation. In certain embodiments, the dielectric constant of the second microwave laminate can be about 3.27 and the dissipation factor of the second microwave laminate can be about 0.0020. A height of the second microwave laminate can be about 0.508 mm, as a non-limiting example.

Figure 20:
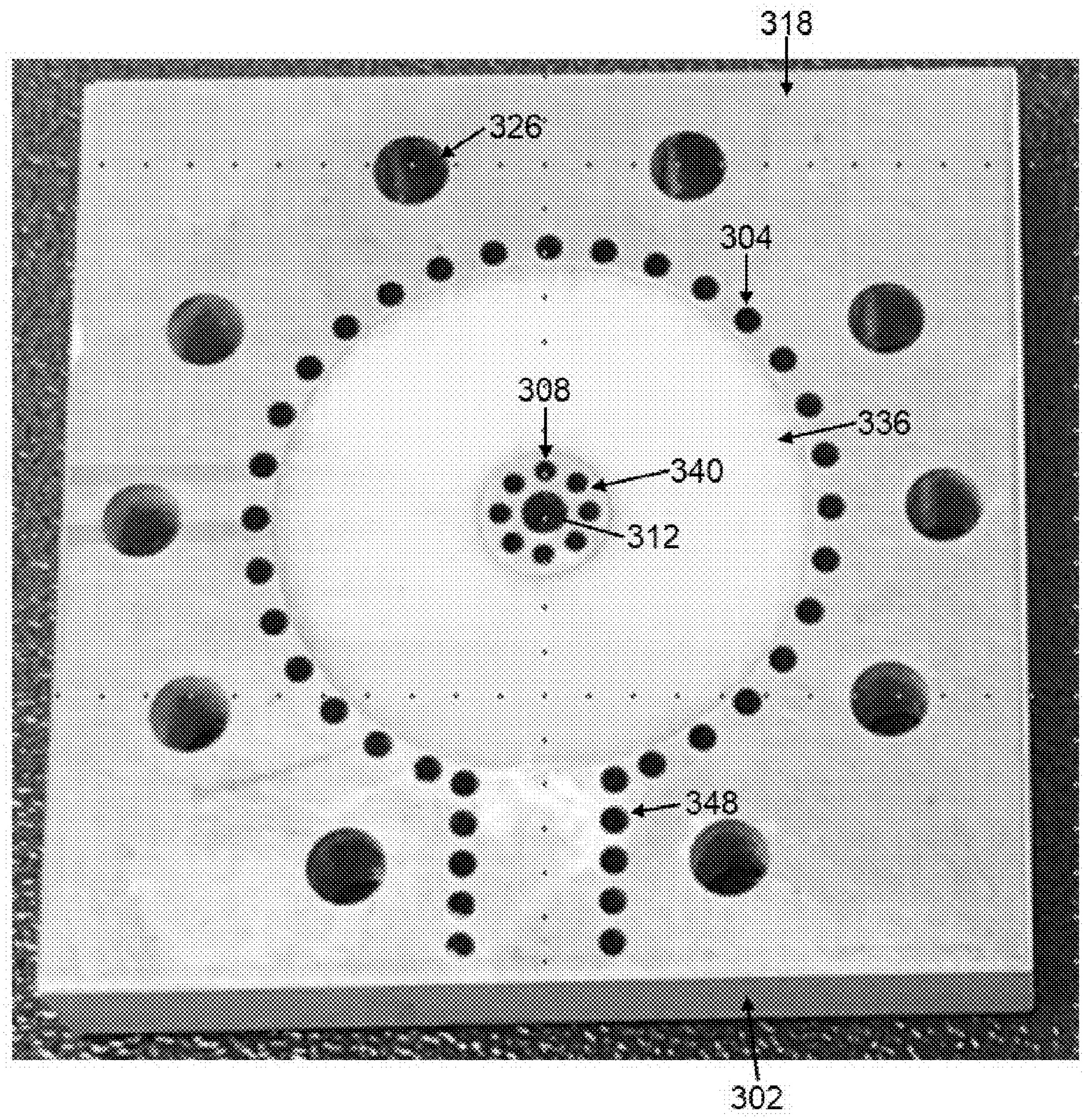
FIG. 20: Top perspective view of a first substrate of a non-limiting example of the second embodiment.
Figure 21:
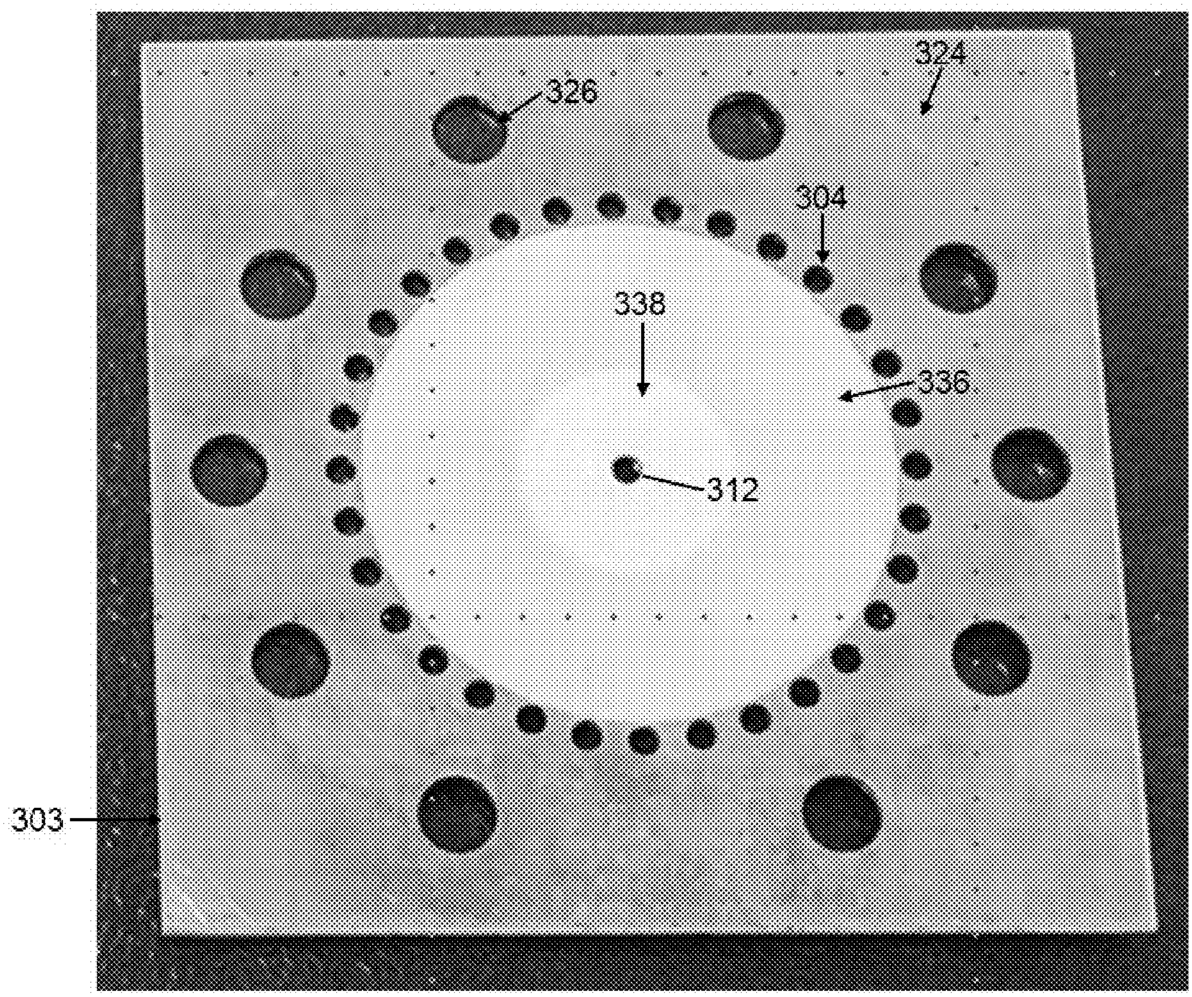
FIG. 21: Bottom perspective view of a second microwave laminate of the non-limiting example of the second embodiment depicted in FIG. 20.

Referring to FIGS. 20-21, each of the first substrate 302 and the second substrate 303 can include one or more holes 326 formed therethrough to facilitate connecting the first substrate 302 to the second substrate 303. For example, fasteners can be disposed through the one more holes 326. However, it should be appreciated that other methods can be used to connect the first substrate 302 to the second substrate 303 and are encompassed within the scope of the present disclosure.

Figure 22:
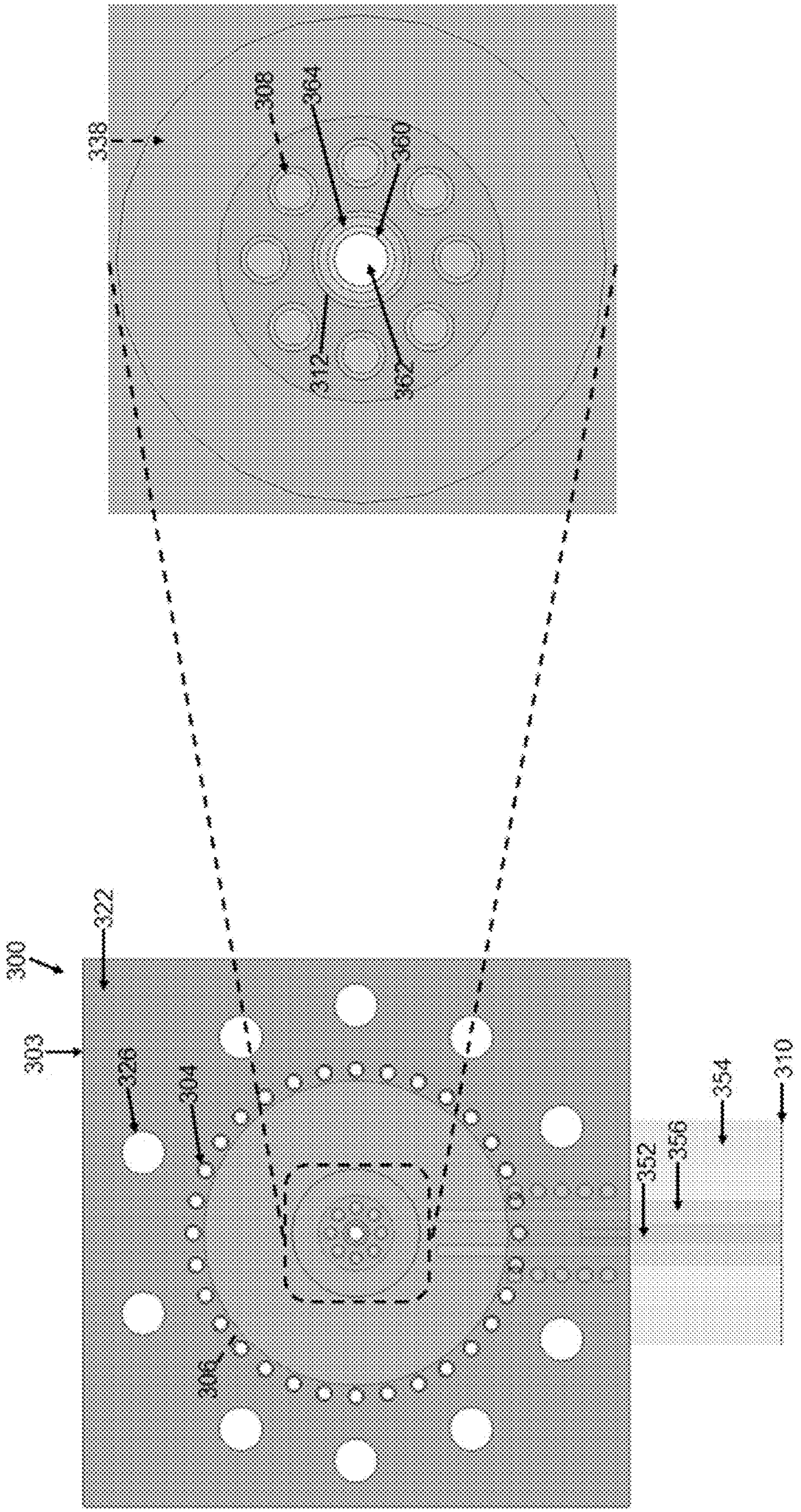
FIG. 22: Top plan view of the non-limiting example second embodiment plasma jet assembly depicted in FIGS. 20-21, including an enlarged view.

Referring to FIGS. 20-22, the outer perimeter of via-holes 304 is formed through the first substrate 302 and the second substrate 303. The outer perimeter of via-holes 304 functions as the outer perimeter 214 of via-holes 212 of the second embodiment of the plasma jet assembly 200 depicted in FIG. 2 and described above. The outer perimeter of via-holes 304 is capable of reflecting the electromagnetic waves back and forth between the via-holes of the outer perimeter 304. One or more of the via-holes of the outer perimeter 304 can have a radius of about 0.4 and about 1 mm of copper cladding, as non-limiting examples. In certain embodiments, the outer perimeter of via-holes 304 has a substantially circular shape. The outer perimeter of via-holes 304 is configured to act as the walls of the cavity resonator 306.

Referring still to FIGS. 20-22, the cavity resonator 306 is formed between the first substrate 302 and the second substrate 303 and within the outer perimeter of via-holes 304. The cavity resonator 306 is capable of receiving electromagnetic waves which reflect back and forth between the outer perimeter of via-holes 304. The cavity resonator 306 can have a radius of about 7.15 mm, as a non-limiting example. In certain embodiments, each of the first top cladding 328 and the second bottom cladding 334 can have a recess 336 formed therein for cavity continuation of the cavity resonator 306, as shown in FIGS. 20-22. In certain embodiments, a central recess 338 is formed in the bottom side 324 of the second substrate 303 (e.g., an etched copper cladding on the bottom side 324 of the second substrate 303). The central recess 338 can have a height H 338 of about 200 μm and a radius of about 4 mm, as non-limiting examples. However, other dimensions are possible and encompassed within the scope of the present disclosure.

Referring to FIGS. 20, 22, the inner perimeter of via-holes 308 is formed through at least the first substrate 302 and within the outer perimeter of via-holes 304. In certain embodiments, the inner perimeter of via-holes 308 is concentric with the outer perimeter of via-holes 304. In certain embodiments, the inner perimeter of via-holes 308 has a substantially circular shape. The inner perimeter of via-holes 308 functions as the inner perimeter 215 of via-holes 212 of the second embodiment of the plasma jet assembly 200 depicted in FIG. 2 and described above. Desirably, this allows the cavity resonator 306 to function as an evanescent-mode (EVA) cavity resonator 306. One or more of the via-holes of the inner perimeter 308 can have a radius of about 0.3 mm and about 1 mm of copper cladding, as non-limiting examples. In certain embodiments, the inner perimeter of via-holes 308 is formed through a central copper cladding 340 on the top side 318 of the first substrate 302. The central copper cladding 340 can have a radius of about 2.35 mm, as a non-limiting example.

Figure 23:
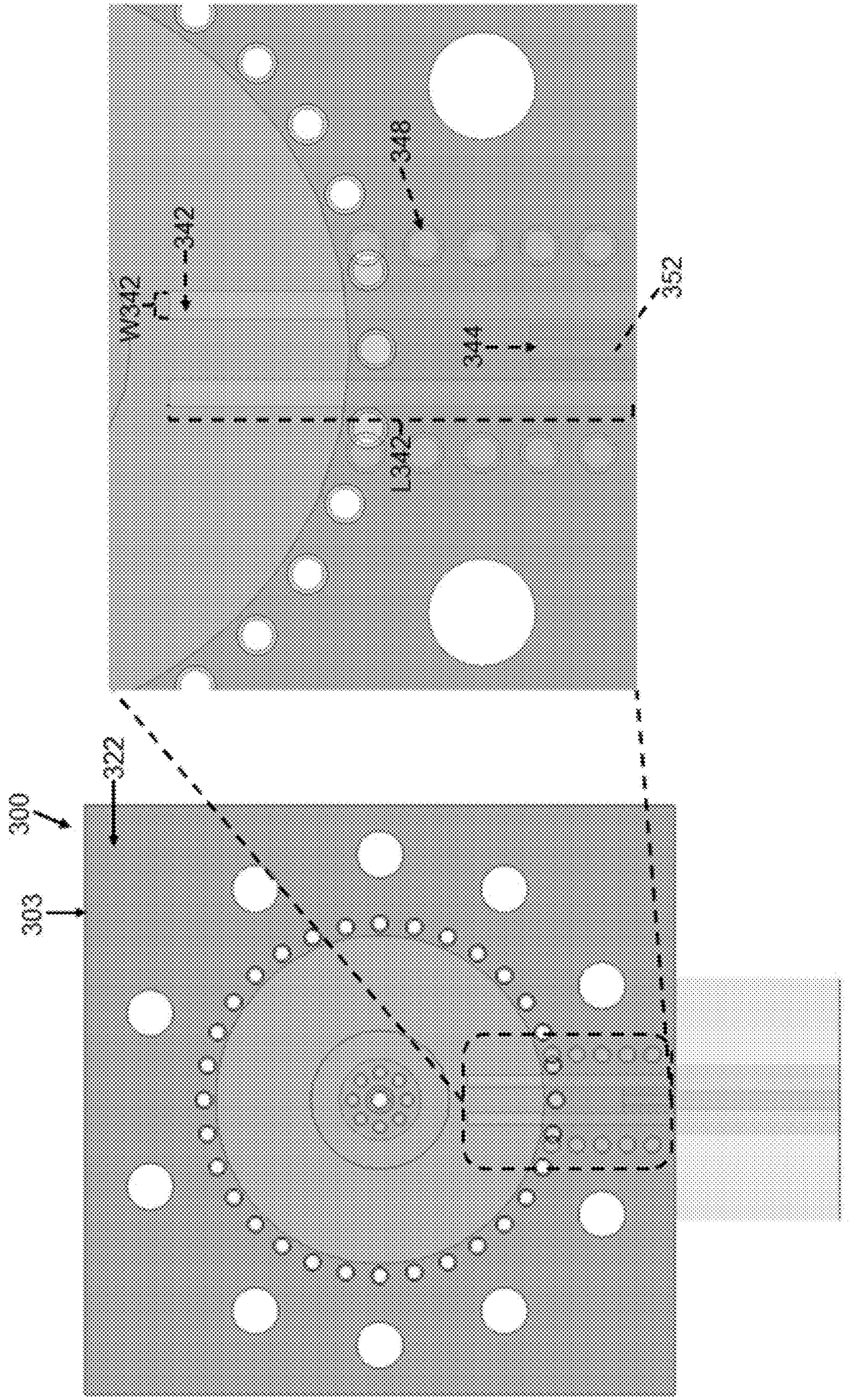
FIG. 23: Top plan view of the non-limiting example second embodiment plasma jet assembly depicted in FIGS. 20-22, including an enlarged view.

The RF port 310 is disposed adjacent to the first substrate 302 and the second substrate 303. With reference to FIGS. 22-23, the RF port 310 can include a pair of coupling input lines 342 disposed on the first substrate 302 and within the outer perimeter of via-holes 304 but not within the inner perimeter of via-holes. In some non-limiting examples, the pair of coupling input lines 342 is disposed on the bottom side 320 of the first substrate 302. In other non-limiting examples, the pair of coupling input lines 342 is disposed between the first substrate 302 and the second substrate 303. The pair of coupling input lines 342 can be disposed parallel to each other. Each of the pair of coupling input lines 342 can have a length L342 of about 12 mm and a width W342 of about 0.7 mm, as non-limiting examples. However, other dimensions are possible and encompassed within the scope of the present disclosure.

Referring to FIG. 22, the RF port 310 is configured to receive an RF connector. The RF connector can be in electrical communication with the pair of coupling input lines 342 and a signal generator. A non-limiting example of the RF connector is an SMA coaxial cable. In certain embodiments, the first substrate 302 includes a plurality of coupling via-holes 348 formed therethrough. The plurality of coupling via-holes 348 can be arranged into two parallel lines of coupling via-holes 348 spaced apart and extending from the RF port 310 and towards the cavity resonator 306. The pair of coupling input lines 342 can be disposed between the two parallel lines of coupling via-holes 348, thereby forming a coplanar waveguide (CPW). Each of the plurality of coupling via-holes 348 can include a radius of about 0.4 mm and about 0.1 mm of copper cladding, as non-limiting examples. The RF port 310 can include an inner conductor 352 and an outer conductor 354 that can be separated by polytetrafluoroethylene material 356. The inner conductor 352 can be disposed on the first substrate 302 and between the pair of coupling input lines 342.

Figure 25:
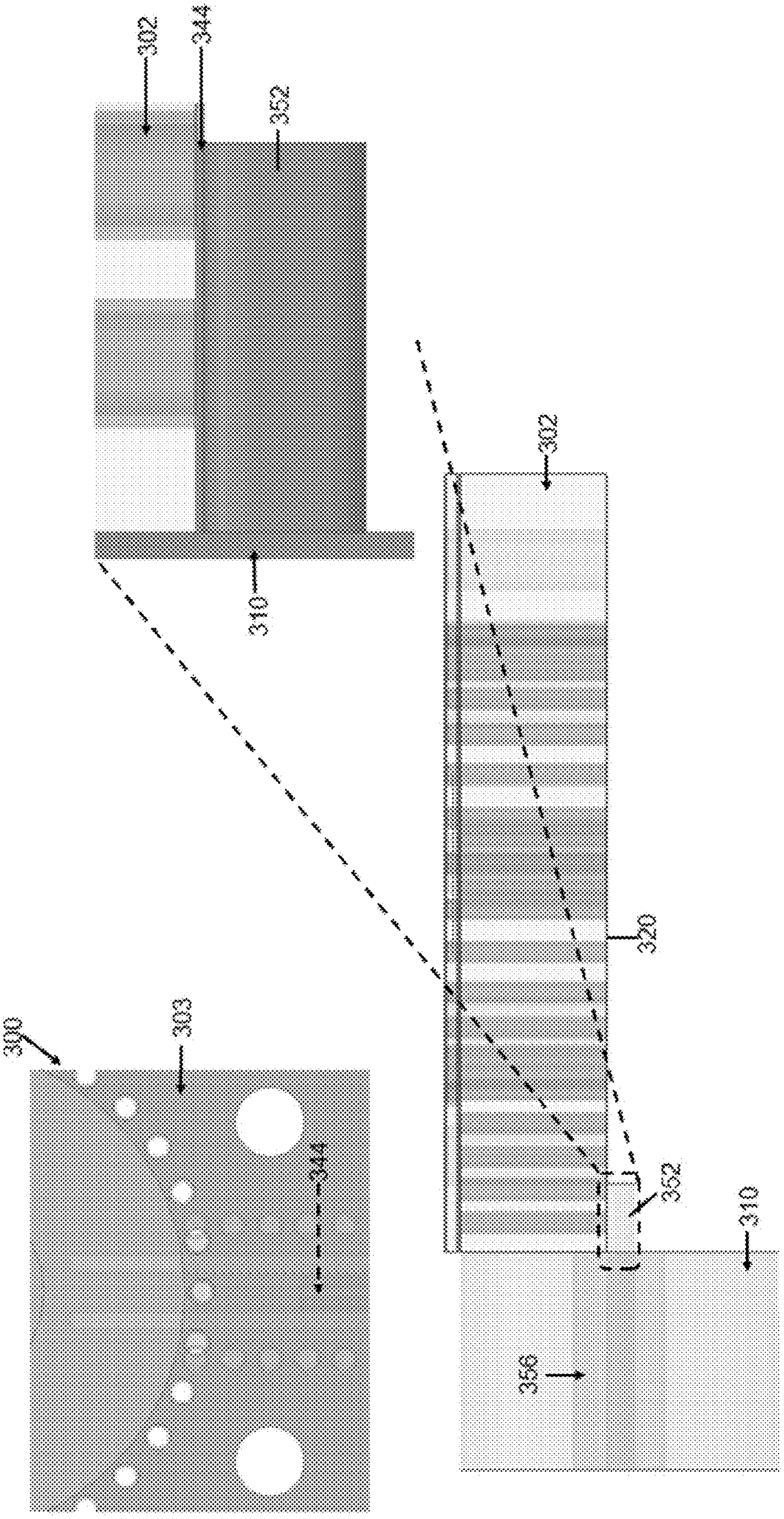
FIG. 25: Top plan view and a side elevational view of the non-limiting example second embodiment plasma jet assembly depicted in FIGS. 20-24, including enlarged views.

Referring to FIGS. 23, 25, the inner conductor 352 can be disposed on the bottom side 320 of the first substrate 302 and between the pair of coupling input lines 342. The inner conductor 352 can extend from the RF port 310 to an intersection area 344. The intersection area 344 is between the two parallel lines of coupling via-holes 348, adjacent to the first bottom cladding 330 of the first substrate 302, but not within the outer perimeter of via-holes 304. Advantageously, the inner conductor 352 does not need to extend all the way to the outer perimeter of via-holes 304 because the intersection area 344 may convey microwave energy to the outer perimeter of via-holes 304. The inner conductor 352 can have a radius of 0.65 mm, as a non-limiting example. The polytetrafluoroethylene material 356 can have a radius of 2.05 mm, as non-limiting example. The outer conductor 354 can have a radius of 7 mm, as a non-limiting example. However, other dimensions are possible and encompassed within the scope of the present disclosure.

With reference to FIGS. 20-22, 24, the central via-hole 312 is formed through the first substrate 302 and the second substrate 303 and within the inner perimeter of via-holes 308. In some non-limiting examples, the central via-hole 312 is not actually a via-hole but is, rather, merely an aperture formed through the first substrate 302 and the second substrate 303. In some non-limiting examples, the central via-hole 312 is concentric with the inner perimeter of the via-holes 308 and the outer perimeter of the via-holes 304. The central via-hole 312 can have a radius of about 0.7 mm and 0.1 mm copper cladding, as non-limiting examples. However, other dimensions are possible and encompassed within the scope of the present disclosure. The central via-hole 312 can function as the central via-hole 216 of the second embodiment of the plasma jet assembly 200 depicted in FIG. 2 and described above. In particular, the central via-hole 312 can be configured to direct a flow of gas to a space 358 within the inner perimeter of via-holes 308 where an electric field concentrates upon the coupling of electromagnetic energy and in a direction through the central via-hole 312 and out of the plasma jet assembly 300. In certain embodiments, the space 358 where the electric field concentrates can be adjacent to the central recess 338 and the central copper cladding 340, as shown in FIG. 24. In some embodiments, the space 358 where the electric field concentrates is the central recess 338.

Figure 26:
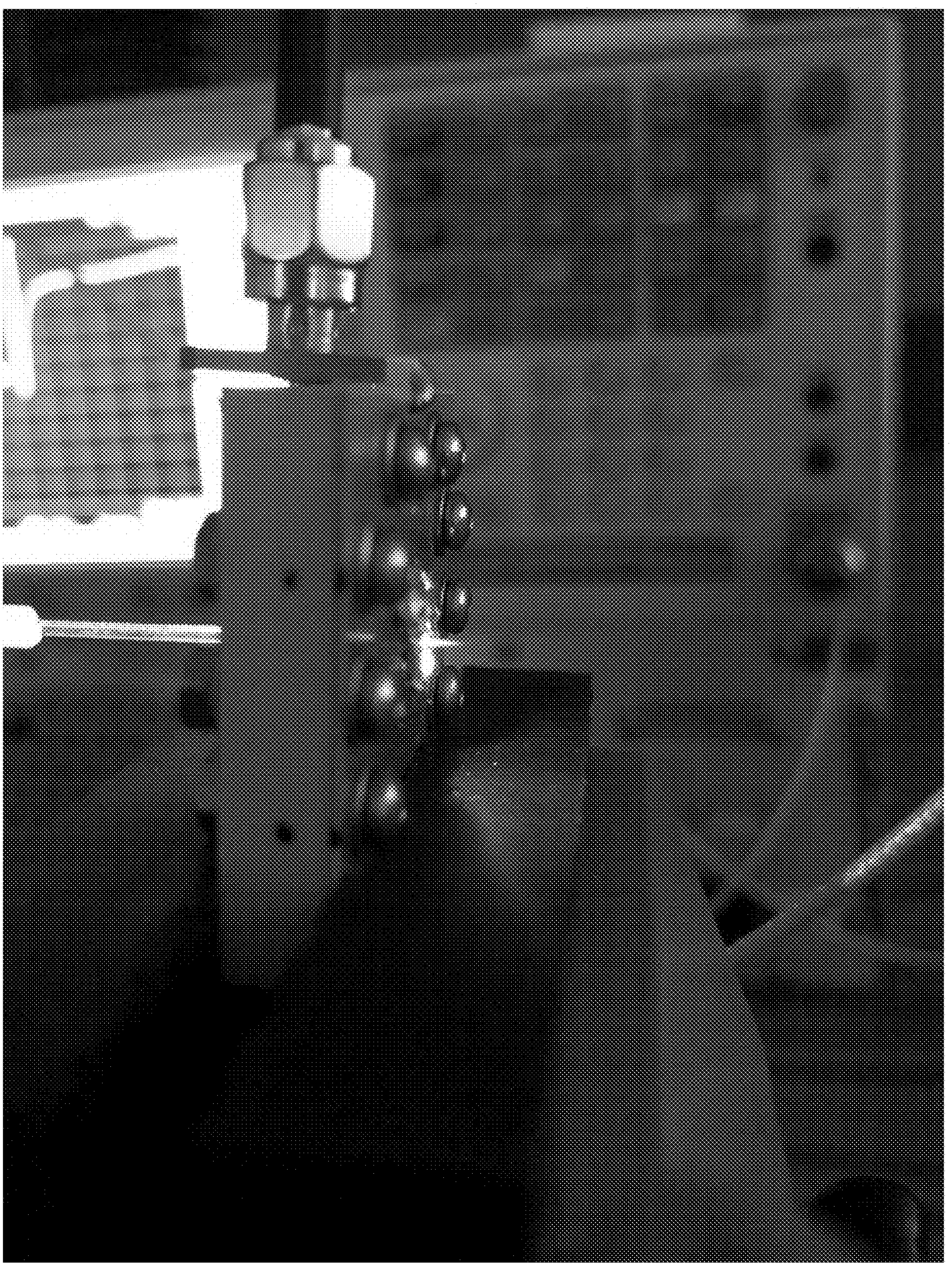
FIGS. 26-27: Photographs showing the non-limiting example second embodiment plasma jet assembly depicted in FIGS. 20-25 in operation and emitting a plasma jet.
Figure 27:
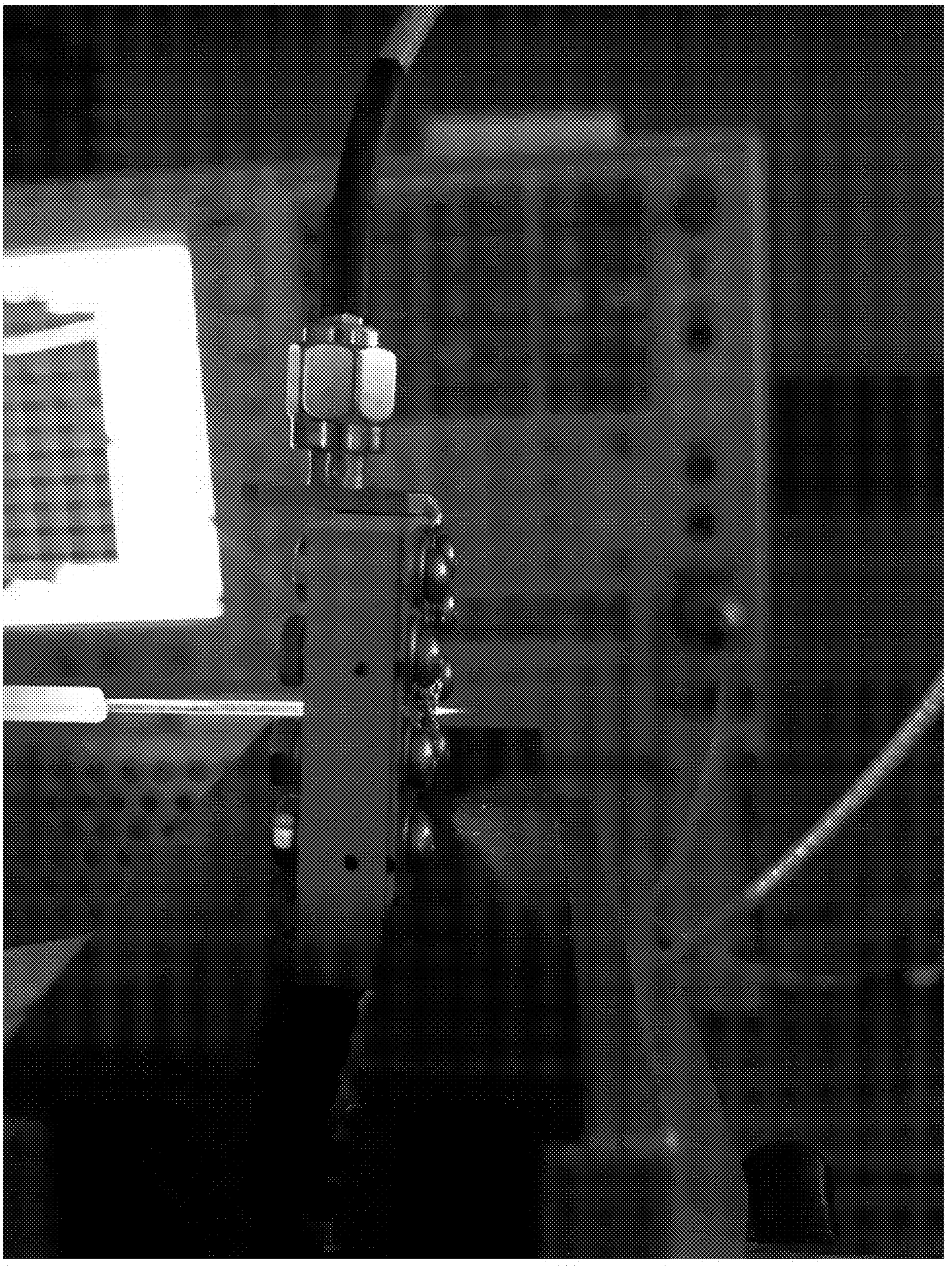

In certain embodiments, a gas transport tube 360 is disposed through the central via-hole 312, as shown in FIGS. 22 and 24. A non-limiting example of the gas transport tube 360 can include a capillary tube. The gas transport tube 360 can be configured to direct a flow of gas to the space 358 within the inner perimeter of via-holes 308 where an electric field concentrates upon the coupling of electromagnetic energy and in a direction through the central via-hole 312 and out of the plasma jet assembly 300. The gas transport tube 360 can have an inner radius of 0.45 mm, an outer radius of 0.55 mm, and an air gap 362 of 0.9 mm, as non-limiting examples. However, other dimensions are possible and encompassed within the scope of the present disclosure. In certain embodiments, an intermediate gap 364 is defined between the central via-hole 312 and the gas transport tube 360. The intermediate gap 364 can be about 0.15 mm, as a non-limiting example. However, other dimensions are possible and encompassed within the scope of the present disclosure In operation, the outer perimeter of via-holes 304 in combination with the inner perimeter of via-holes 308 facilitate an electrical field concentration in the space 358. With enough input power to the cavity resonator 306, via the RF connector, the high electric field concentration ionizes the gas funneling through the central via-hole 312 to produce a jet of plasma (a plasma plume), as shown in FIGS. 26-27. The jet of plasma exits the second substrate 303 via the central via-hole 312 due to the gas flowing through the first substrate 302 and the second substrate 303. The gas thus acts not only as the source of the ions to create plasma, but also as a carrier gas for the plasma. Desirably, the plasma jet assembly 300 has higher efficiency than conventional plasma jets, lower power consumption, has a tunable frequency with a low response time, and has a compact form factor.

A method of using the plasma jet assembly 300 can include connecting the RF connector to the signal generator and the RF port 310, disposing the gas transport tube 360 through the central via-hole 312, connecting the gas transport tube 360 to a gas source, and activating the gas source and the signal generator to produce a plasma jet out of the central via-hole 312 on the top side 322 of the second substrate 303.

Examples

These examples describe the development of a highly efficient microwave plasma jet based on evanescent-mode (EVA) cavity resonator technology. An EVA cavity resonator can be formed by loading a normal cavity with a post at the center. One important consequence of this loading is the electric field concentration in the gap between the resonator post and the top wall. This concentration of the electric field may be used, for instance, for the implementation of plasma-based high-power microwave limiters and switches. In the present disclosure, however, a gas flow mechanism is implemented to pass through the EVA critical region to realize a high-efficiency resonant microwave plasma jet. Theory of operation, design process, and modeling results are described below, along with the fabrication process, experimental setup, and measurement results. Plasma jet diagnostics are also described.

Design and Simulation

As noted above, an evanescent-mode cavity resonator can be formed by loading an enclosed cavity with a post in the center. Due to this loading, the electric field gets concentrated in the region between the post and the resonator ceiling, resulting in an effective capacitance. As a result, the size of an EVA cavity resonator is significantly reduced compared to an ordinary cavity resonator. The quality factor of EVA cavity resonators is typically high (≥500), which makes them good candidates for many applications, such as for tunable and selective filters.

Figure 3:
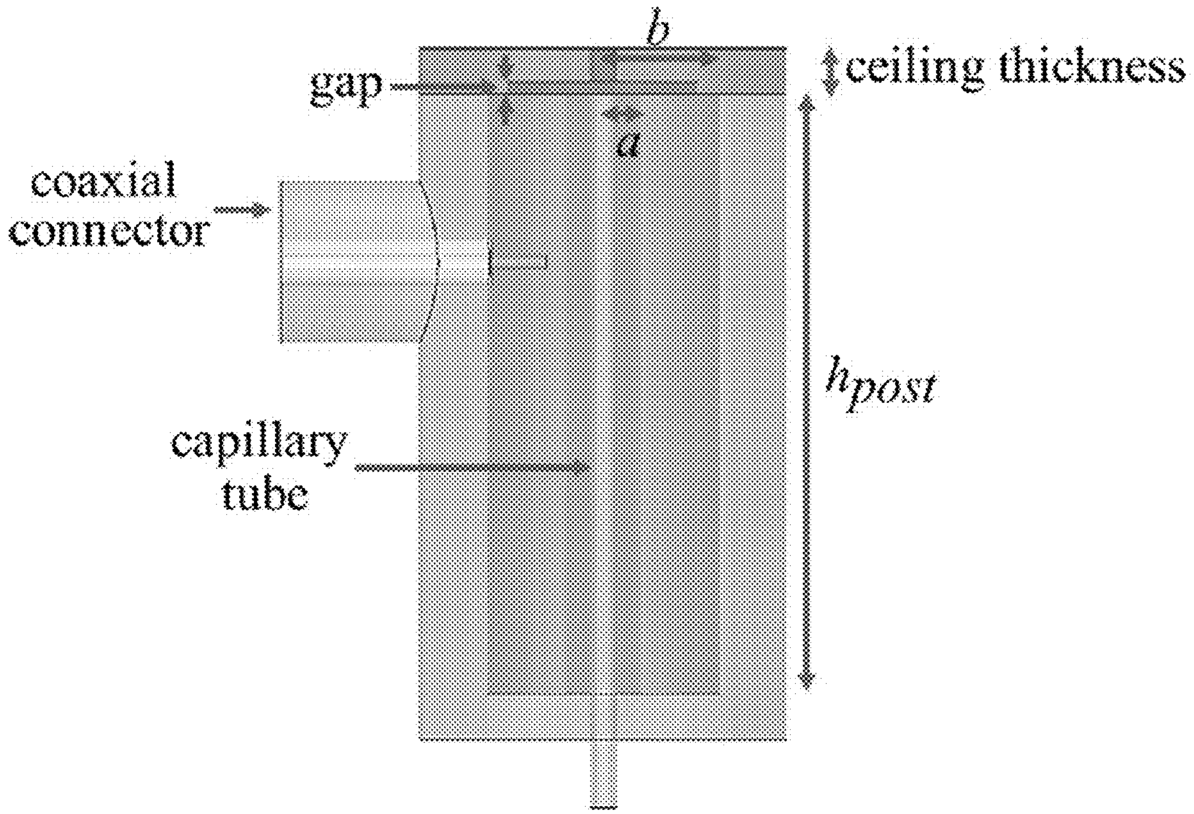
FIG. 3: Structure and main parameters of an EVA cavity resonator-based microwave plasma jet.

FIG. 3 shows certain parameters associated with an EVA cavity resonator. Here, $h_{post}$, gap (or g), a, and b represent the height of the post, the height of the capacitive gap, the radius of the post, and the radius of the cavity, respectively. The inductance and capacitance values associated with the structure are important for the resonant frequency—the gap results in the capacitance of $C_{gap}$. The post contributes to the inductance of the cavity, $L_{post}$, and coaxial capacitance, $C_{coax}$. Also, $C_{fringe}$ corresponds to the fringe field effect at the edge of the post.

$$L_{post} = \frac{376.7343}{6\pi \times 10^8} \times \ln\frac{b}{a} \times h_{post} \tag{1}$$

$$C_{coax} = \frac{2\pi e_0}{\ln\frac{b}{a}} \times h_{post} \tag{2}$$

$$C_{gap} = k_{gap} \times \frac{\pi e_0 a^2}{g} \tag{3}$$

$$C_{fringe} = e_0 a \times \ln\left(\frac{a}{2g}\right). \tag{4}$$

Here, $k_{gap}$ is a coefficient used to adjust the $C_{gap}$ due to the capillary tube in the gap in the structure introduced in this example. The resonant frequency of the structure can then be represented as $$f_{res} = \frac{1}{2\pi\sqrt{L_{post} C_{total}}}, \tag{5}$$

where $C_{total}$ is the sum of the above three capacitors, as they are formed in a parallel configuration.

An EVA cavity resonator is advantageous for plasma jet creation because of the structural symmetry and the gas flow that can be conducted through the central post. In the structure disclosed herein, this has been accomplished by drilling a hole through the post and then utilizing a capillary tube within the post to pass the gas to the outlet through the critical gap area of the EVA resonator. In this case, the capacitive gap is partially filled by the dielectric of the tube. Because of the hole in the electrode and the presence of the capillary tube, the $C_{gap}$ is affected, which is incorporated by the $k_{gap}$ coefficient in equation (3). With enough input power to the resonator and consequently high electric I field over the critical gap area of the EVA resonator, the gas going through this area ignites, and the plasma plume is forced out by the gas flow. In this example, a 2.45 GHz resonant frequency was chosen as it is one of the standard frequencies for microwave plasma generation, making it easier to benchmark the EVA cavity plasma jet. However, this technique can be extended to other frequencies.

To address the goal of achieving a highly efficient plasma jet, a very high |E|-field in the critical gap area, between the surface above the post and the ceiling, is important. This can be obtained by a high Q along with a good matching performance at the resonant frequency of 2.45. To drill a hole to pass a tube, such as a capillary tube with 1.12 mm of external diameter, a minimum post radius is important. For the cavity radius, an optimum b/a is around 3.59 for maximum Q. As gas breakdown takes place in the capacitive gap region, the gap size (gap, or g) has to be such that there can be enough volume of gas, while remaining practical for CNC fabrication. The 50-impedance matching is mainly adjusted by positioning the height and pin length of the coaxial connector. The connector pin length is adequately long to provide a strong coupling of the input energy to the resonator, having a high external coupling coefficient. The dimensions of the designed EVA plasma jet at 2.45 GHz are presented in Table 1. The microwave plasma jet operates at atmospheric pressure with a controlled gas flow rate system.

TABLE 1

Parameters of the 2.4 GHz EVA plasma jet

| Parameter | Symbol | Dimension (mm) |
|---|---|---|
| cavity radius | b | 5 |
| post radius | a | 1.6 |
| gap | g | 0.6 |
| post height | $h_{post}$ | 25.84 |
| tube inner radius | $r_{tube}$ | 0.45 |
| tube wall thickness | $t_{tube}$ | 0.1 |
| cavity ceiling thickness | $t_{ceiling}$ | 2 |

Figure 4:
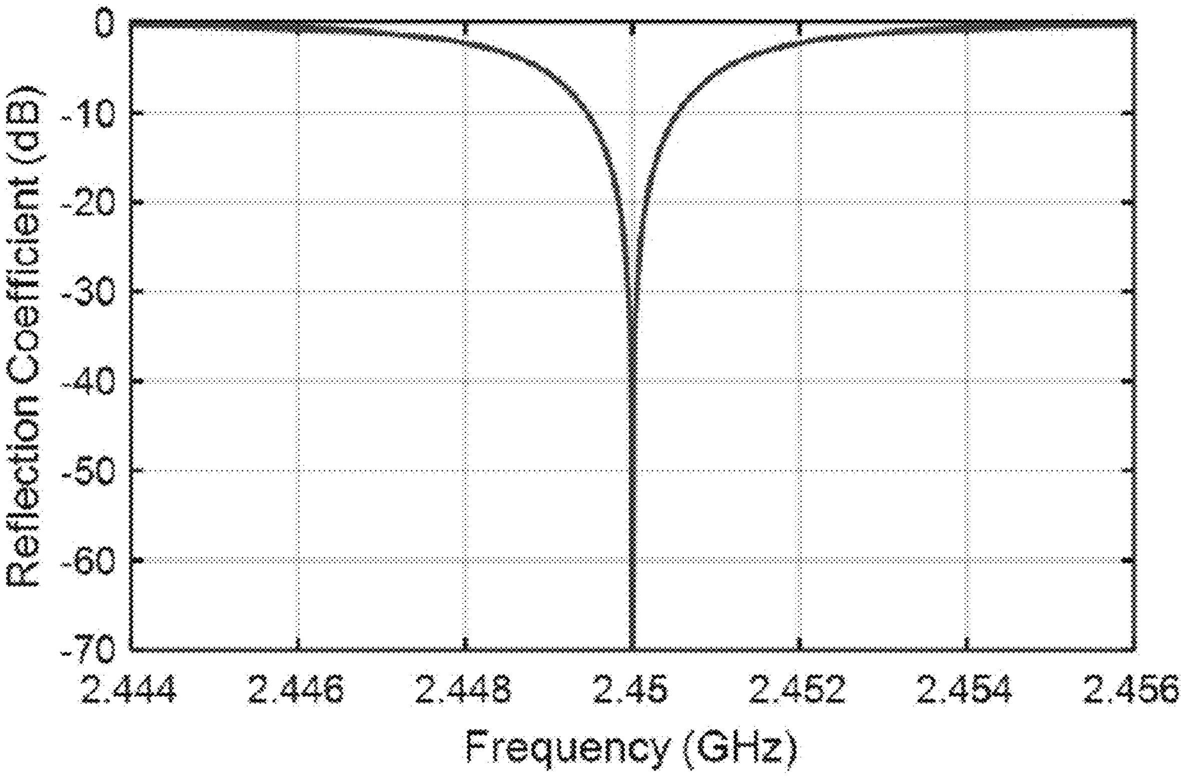
FIG. 4: Graph of simulated reflection coefficient (Si1) of the EVA cavity resonator showing a solid resonance at 2.45 GHz.
Figure 5:
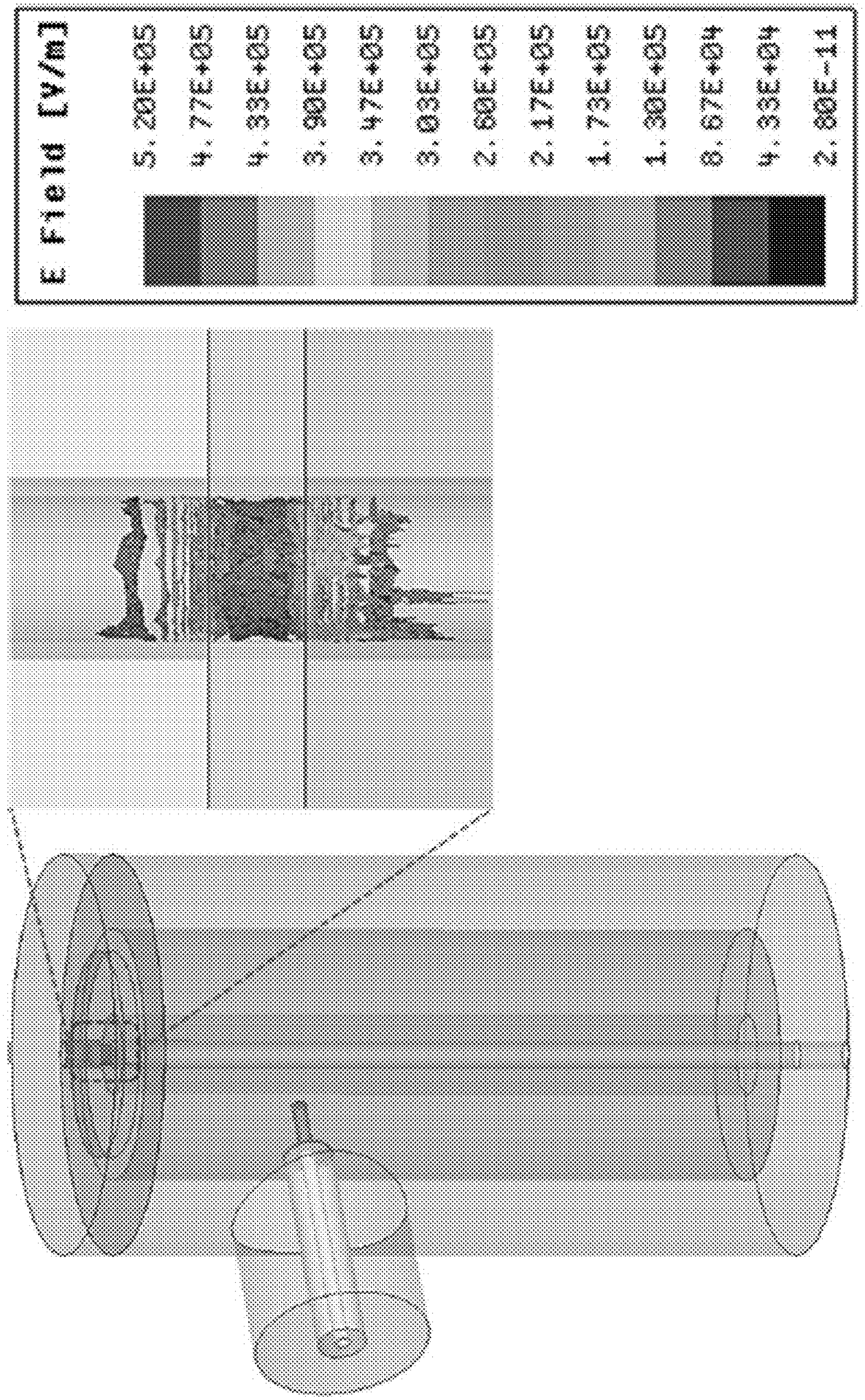
FIG. 5: Perspective view of a non-limiting example of the first embodiment having a high concentration of E-field in the critical gap area of the EVA cavity resonator with 1 W input power at the resonant frequency of 2.45 GHz.

The designed EVA cavity-based plasma jet was simulated using ANSYS HFSS, a 3D electromagnetic (EM) simulation software. As seen in FIG. 4, a strong resonance at 2.45 GHz with excellent matching performance was observed. The eigenmode simulated Q of the resonator was calculated to be around 1500. FIG. 5 shows how the E-field concentrates in the capillary tube section that passes through the critical gap area over the resonator post. As seen at the resonant frequency, the device generates an E-field in the order of $5.2\times10^5$ V/m in the critical gap region in the presence of 1 W input power. This strong E-field is responsible for the gas breakdown and plasma ignition in that gap.

Fabrication Process

Figure 6:
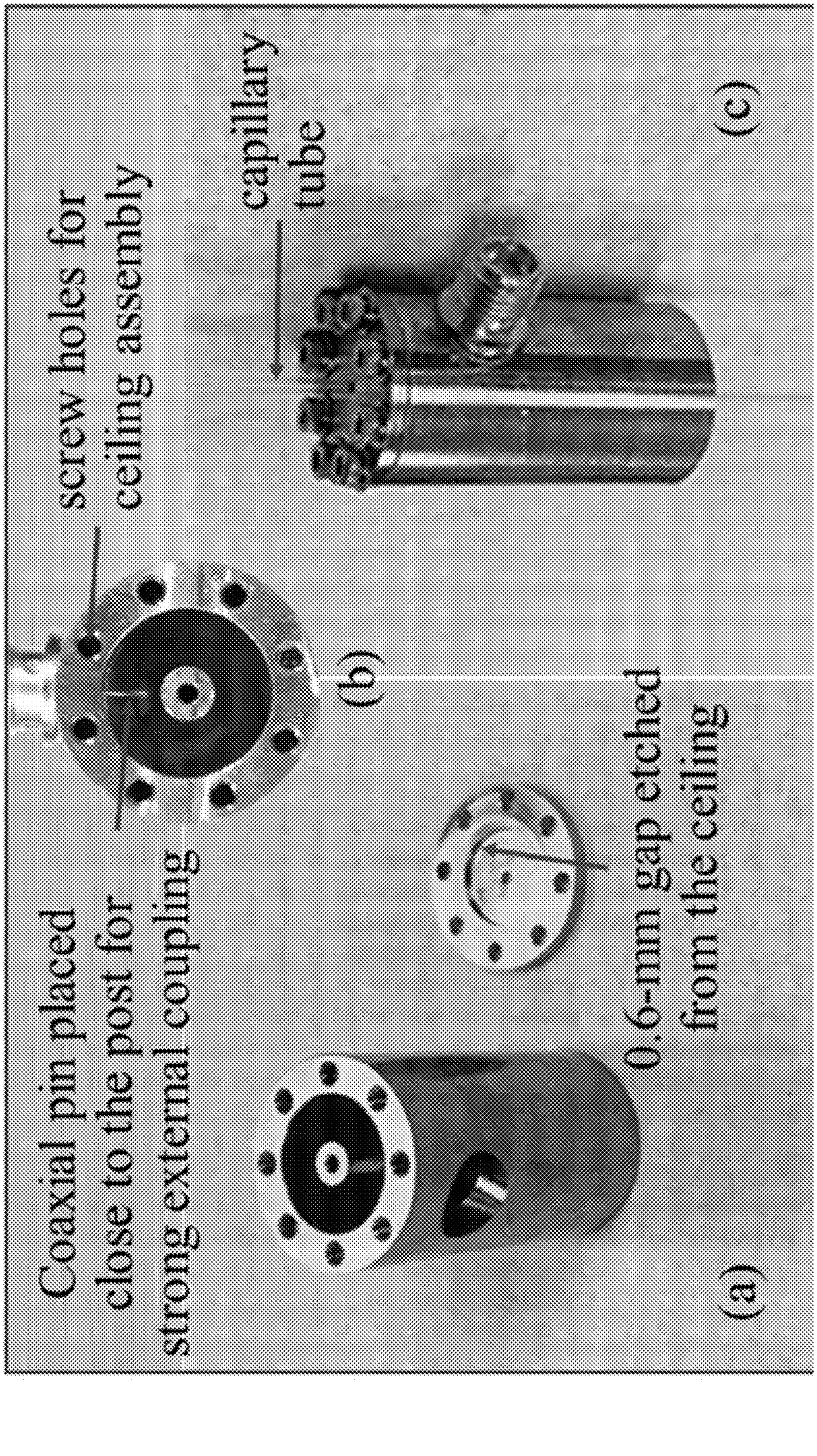
FIG. 6: Non-limiting example 2.45 GHz EVA cavity plasma jet: two parts (body and lid) of the EVA cavity resonator after copper CNC machining (a), assembly of the push fit SMA coaxial connector showing that the pin gets close (for strong external coupling) but does not touch the post (b), and the fully assembled EVA cavity plasma jet including a capillary tube to pass the gas flow through the resonator gap region (c).

The designed EVA cavity structure described in this example was fabricated by copper CNC machining, as shown in FIG. 6. The 0.6 mm critical gap over the post was made by drilling out the gap in the ceiling, (shown at (a) in FIG. 6). Since the resonant frequency strongly depends on this gap size, because of its dominant role in $C_{gap}$, eight screws as well as a thick wall thickness were employed. Any air gap between the ceiling and the body of the resonator not only affects the resonant frequency but also results in degradation of the resonator Q, or equivalently a higher loss. A push fit SMA connector was used for easier assembly, as seen in (b) in FIG. 6. The connector height and pin length are two important parameters regarding impedance matching, optimized in the simulation process. It is noted that the connector pin must get close to the cavity post to generate a strong external coupling of EM energy to the resonator, which is important for efficient plasma generation. However, the connector pin does not touch the post. A preferred placement of the SMA connector was found to be at 18.65 mm from the cavity bottom surface, and a preferred distance between the pin of the SMA connector and the post was found to be 0.89 mm. The resonator wall thickness was chosen so that this gap between the coaxial pin and the center post is automatically achieved without trimming the pin length. After the ceiling assembly, a capillary tube was inserted through the post and the ceiling holes. The capillary tube reached the outlet and barely crossed the surface, enough for the plasma jet to get out. The fabricated EVA cavity plasma jet after completion of the assembly is shown in (c) in FIG. 6.

Measurement Setup

Figure 7:
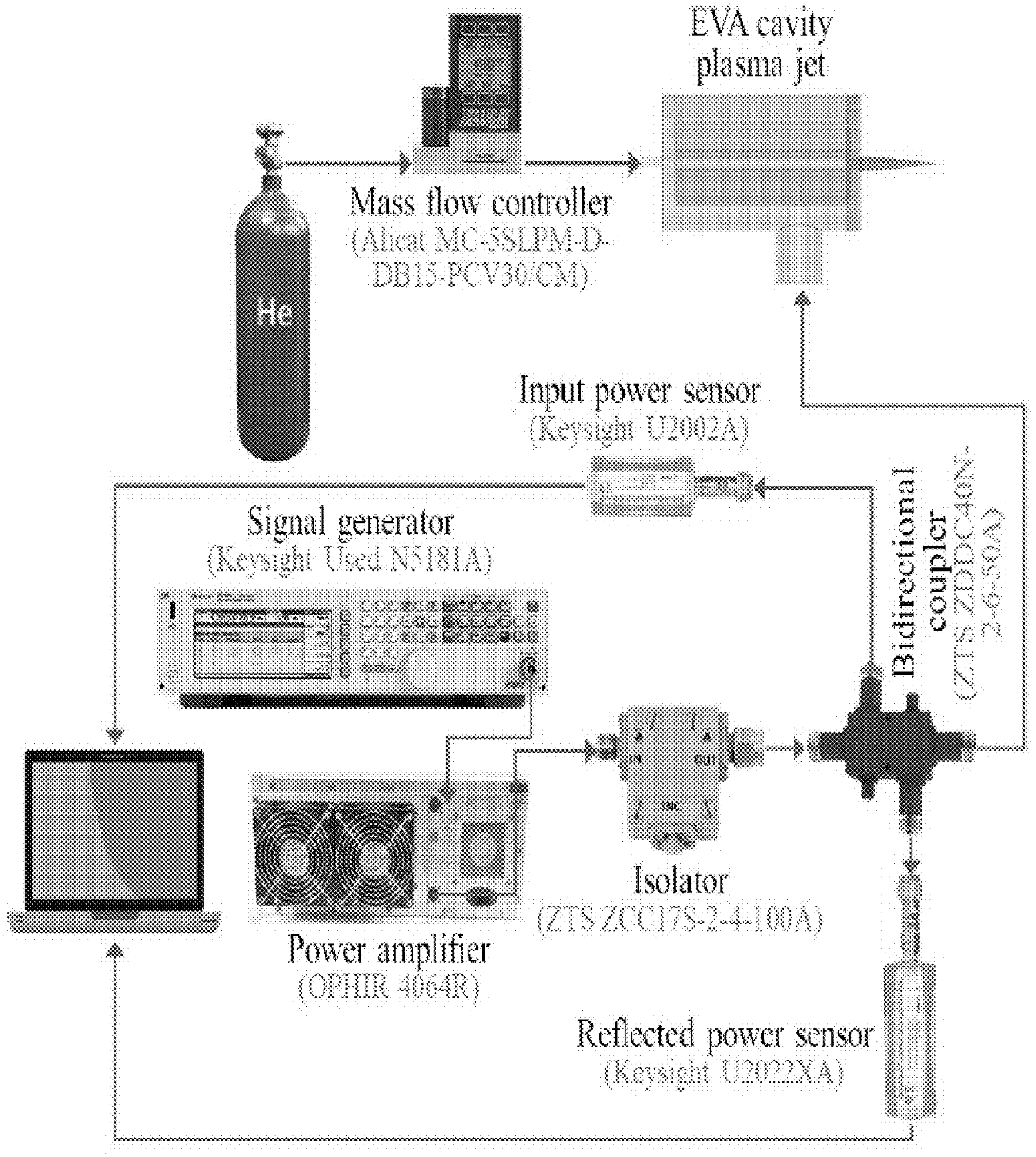
FIG. 7: Block diagram of the EVA cavity microwave plasma jet measurement setup used in the examples herein.

As presented in FIG. 7, a test setup was designed and implemented for an accurate characterization of the EVA cavity microwave plasma jet. Helium gas was fed to the capillary tube through a mass flow controller (MFC) that can provide an accurate flow rate of up to 7 slpm. In practice, a flexible dielectric tube was utilized to connect the MFC and the capillary glass tube. A 2.45 GHz microwave signal generated by a signal generator was fed to the resonator after being amplified by a power amplifier. An isolator is implemented at the output of the amplifier to absorb the reflected power following plasma ignition, as the frequency response of the resonator changes post breakdown. Also, two USB power sensors were used through a high-power bidirectional coupler at the isolator's output for accurate measurement of the forward and reflected powers at the port of the fabricated EVA plasma jet device.

Experimental Results

Figure 8:
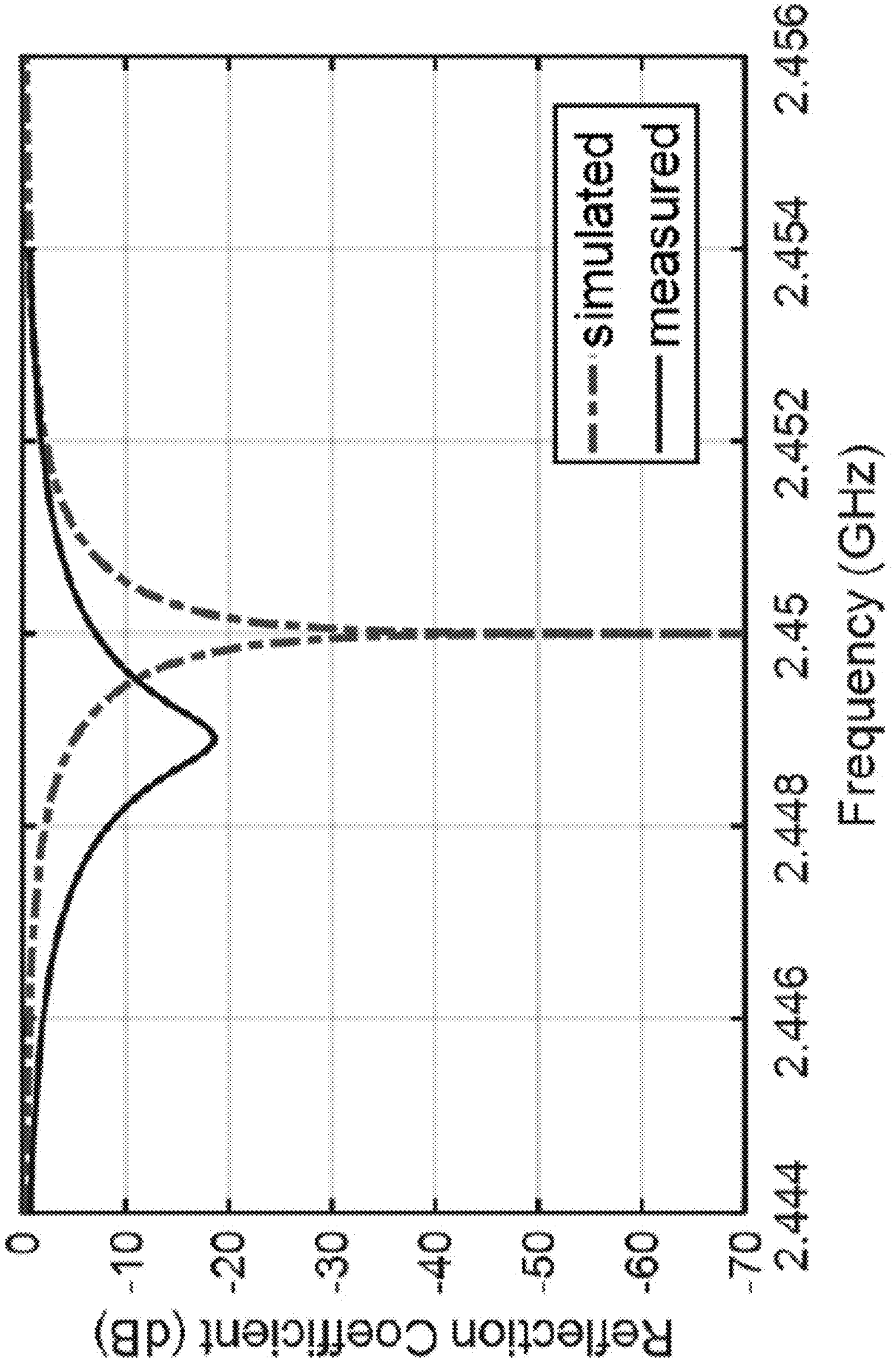
FIG. 8: Graph showing a comparison of the EVA cavity plasma jet's simulated and measured reflection coefficients ($S_{11}$).

At the first step, the reflection coefficient of the assembled device was tested to check the resonance behavior. Although this was an OFF-mode test, it was conducted in the presence of the capillary tube because the capillary tube affects the $C_{gap}$ and hence the resonant frequency. As seen in FIG. 8, there was a good match between the simulated and measured $S_{11}$. A 1.1 MHz downward shift in the measured resonant frequency is due to the fabrication and assembly tolerances. Also, lower Q (higher loss) was observed in measurement. The simulated and measured reflection coefficients were −70 and −18.6 dB, respectively. This is mainly attributed to the leakage of electromagnetic energy from tiny gaps between the resonator body and the ceiling, which is a common practical issue with this structure. Since the measured resonant frequency was 2.4489 GHz, all other measurements were also conducted at this frequency, although it will be referred to as 2.45 GHz herein for easier recall.

Figure 9:
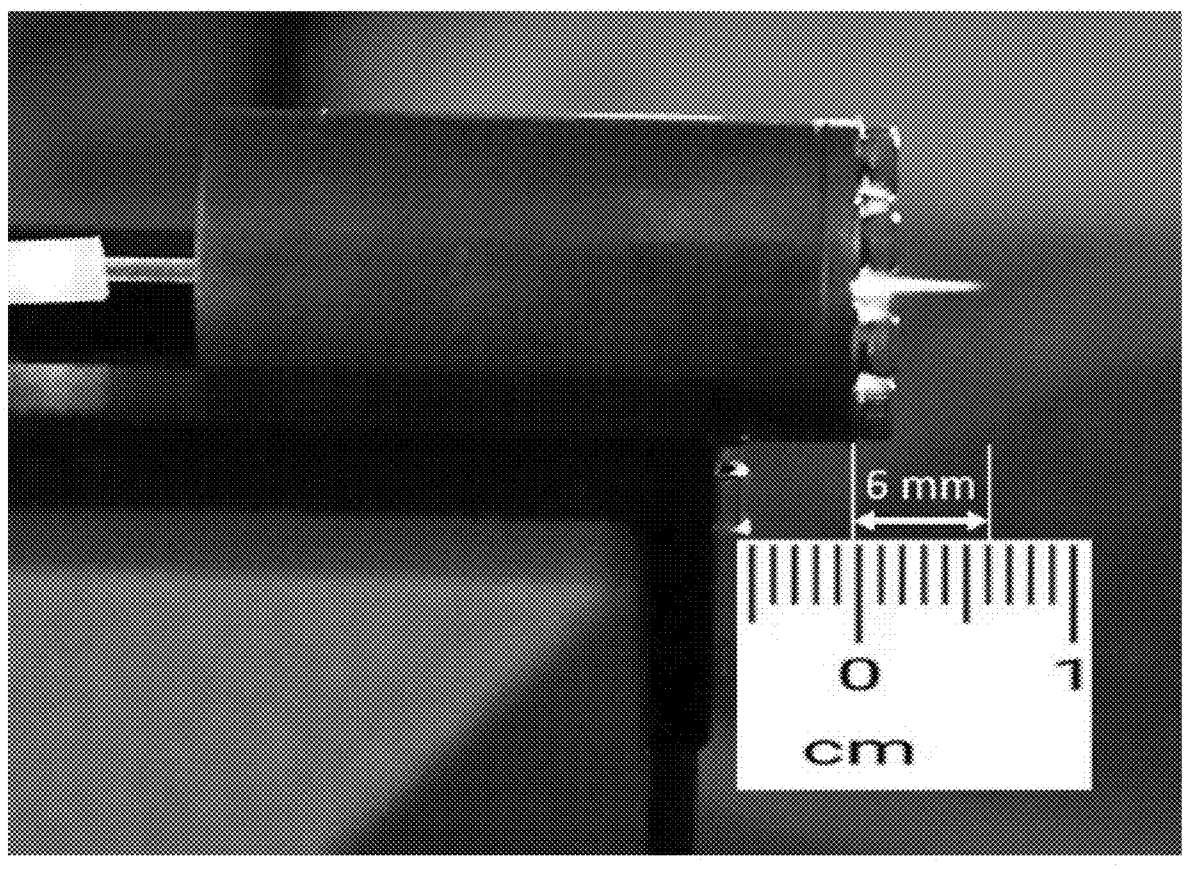
FIG. 9: Photograph of the fabricated EVA plasma jet in ON mode: a 6-mm long helium plasma jet under 5 W input power at 2.45 GHz and a gas flow rate of 7 slpm.

FIG. 9 shows a sample image of an atmospheric pressure air plasma jet generated by the fabricated EVA plasma jet structure. In this case, input power to the device port was 5 W at 2.45 GHz with a helium gas flow rate of 7 slpm. The plasma jet length was measured to be about 6 mm, while this length depends on the input power and, even more importantly, the gas flow rate. The generated plasma jet was touchable, and its temperature depends mainly on the value of microwave input power. In FIG. 9, light is also observed at the bottom of the structure where the gas flow comes in. Since the gas flow is provided by the MFC toward the jet direction with no mismatch in the gas flow path, it is believed without being bound to a particular theory, that the light observed is the light reflection through the glass capillary tube of the plasma ignited inside the critical gap area.

Figure 10:
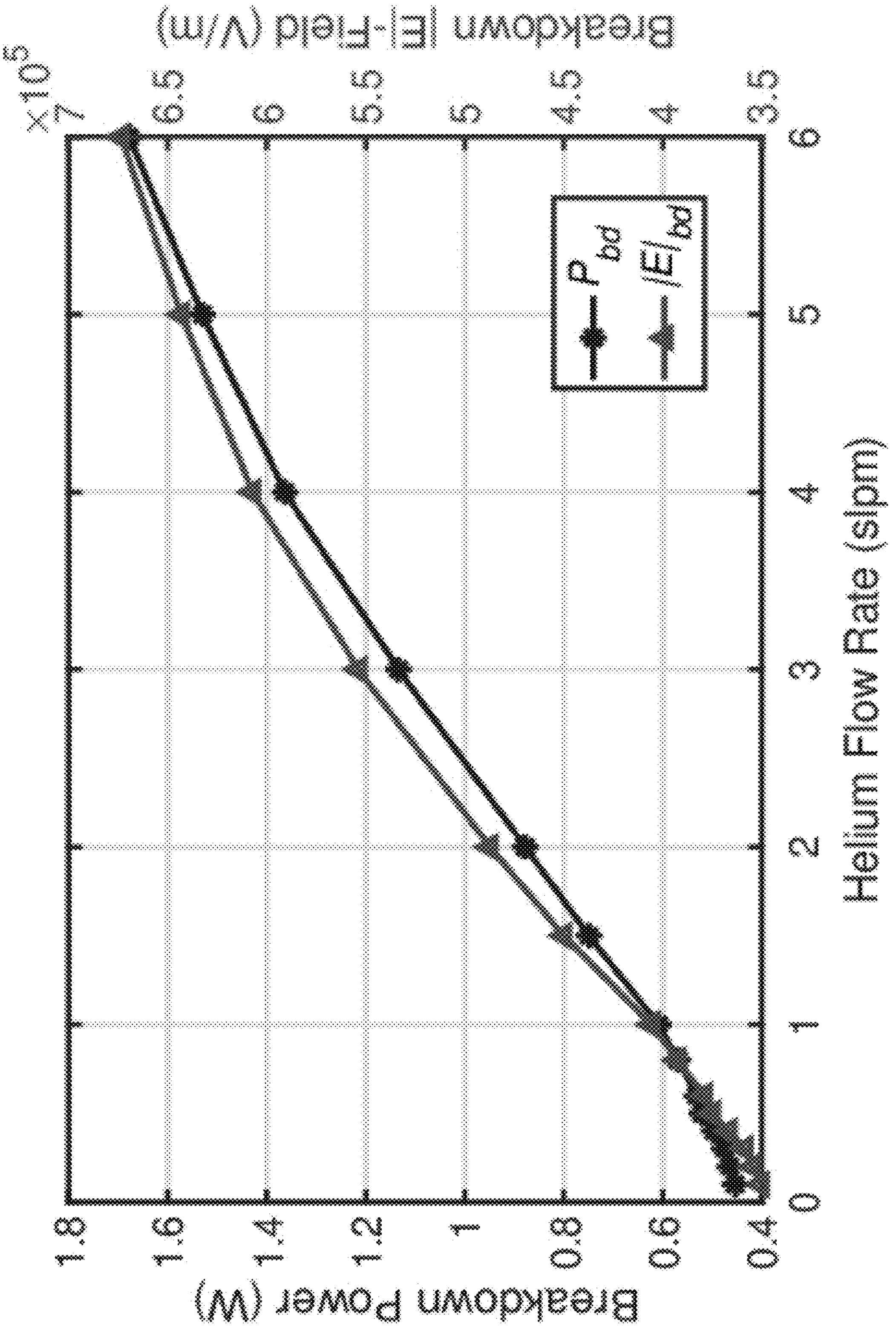
FIG. 10: Graph showing measured breakdown power and E-field (extracted) of the EVA plasma jet under test at different helium flow rates up to 6 slpm.

The first step in generating a stable plasma is to make the gas breakdown. The breakdown voltage lies between the dark and glow discharge regimes. For discharge ignition, reaching the breakdown voltage (field) level in pre-breakdown is necessary. After the plasma is formed (post breakdown), it can typically be sustained at lower power than is needed for breakdown. FIG. 10 presents the measured breakdown power and E-field as a function of the gas flow rate in the capillary tube. The breakdown fields were extracted from HFSS simulations by incorporating the measured breakdown powers from the experiment. The breakdown power/voltage increases with a higher gas flow rate. Without being bound to a particular theory, it is believed this is due to the electron production-loss rate. However, the electron production rate remains almost the same, which results in a higher electrical field (or power) to ignite the plasma jet at a higher flow rate. Therefore, it is easier to first ignite the plasma jet at a lower flow rate and then increase the gas flow if a longer or higher density jet is required. It is also seen that for the helium flow rate in the range of 0.1 slpm to 6 slpm, the breakdown power varies from about 450 mW to 1.65 W, which proves the low-power performance of the microwave plasma jet. The correspondent breakdown E-field is on the order of $10^5$ V/m across the same range of gas flow rate. As mentioned earlier, the plasma sustaining power in post-breakdown is always less than the breakdown power. In this case, it was possible to sustain the plasma jet even with as low as 400 mW of input power at 2.45 GHz for the entire range of 0.1 slpm to 6 slpm of helium flow rate, although the jet length and intensity depend on that flow rate.

Figure 11:
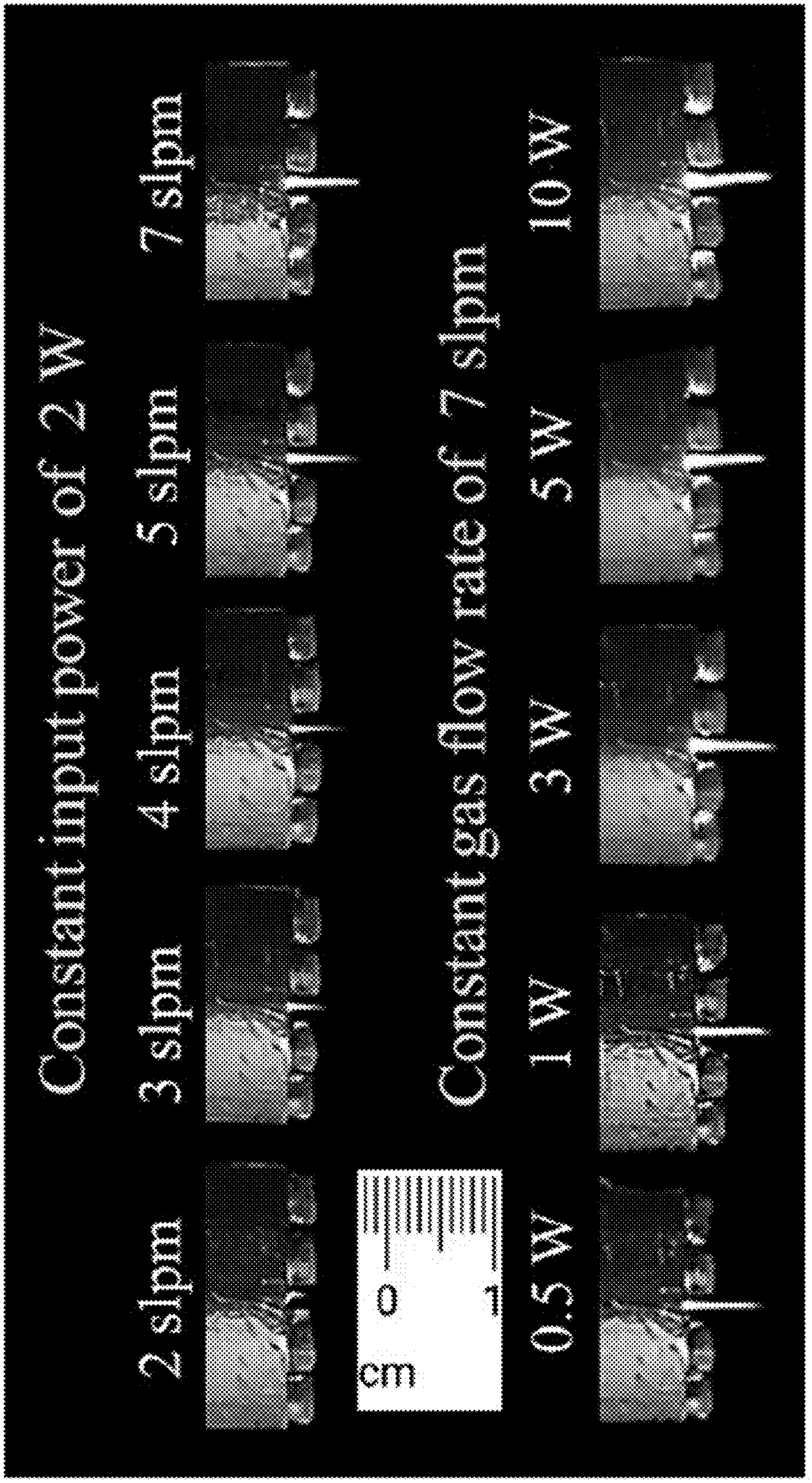
FIG. 11: Photographs of EVA cavity-based 2.45 GHz helium plasma jets at different gas flow rates and input powers.

To investigate the effect of the gas flow rate on the plasma jet, the input power was set at a constant value of 2 W at the resonant frequency of 2.45 GHz, and the gas flow rate was varied from 2 slpm to 7 slpm. As observed in the top row of FIG. 11, with the increase of gas flow rate, the length of the jet kept increasing. The effect of input microwave power was studied by setting the gas flow rate at a constant value of 7 slpm and the input power was varied from 0.5 W to 10 W. As displayed in the bottom row of FIG. 11, although increasing the input power slightly enhanced the jet length, the plasma intensity was increased by the input power.

Figure 12A:
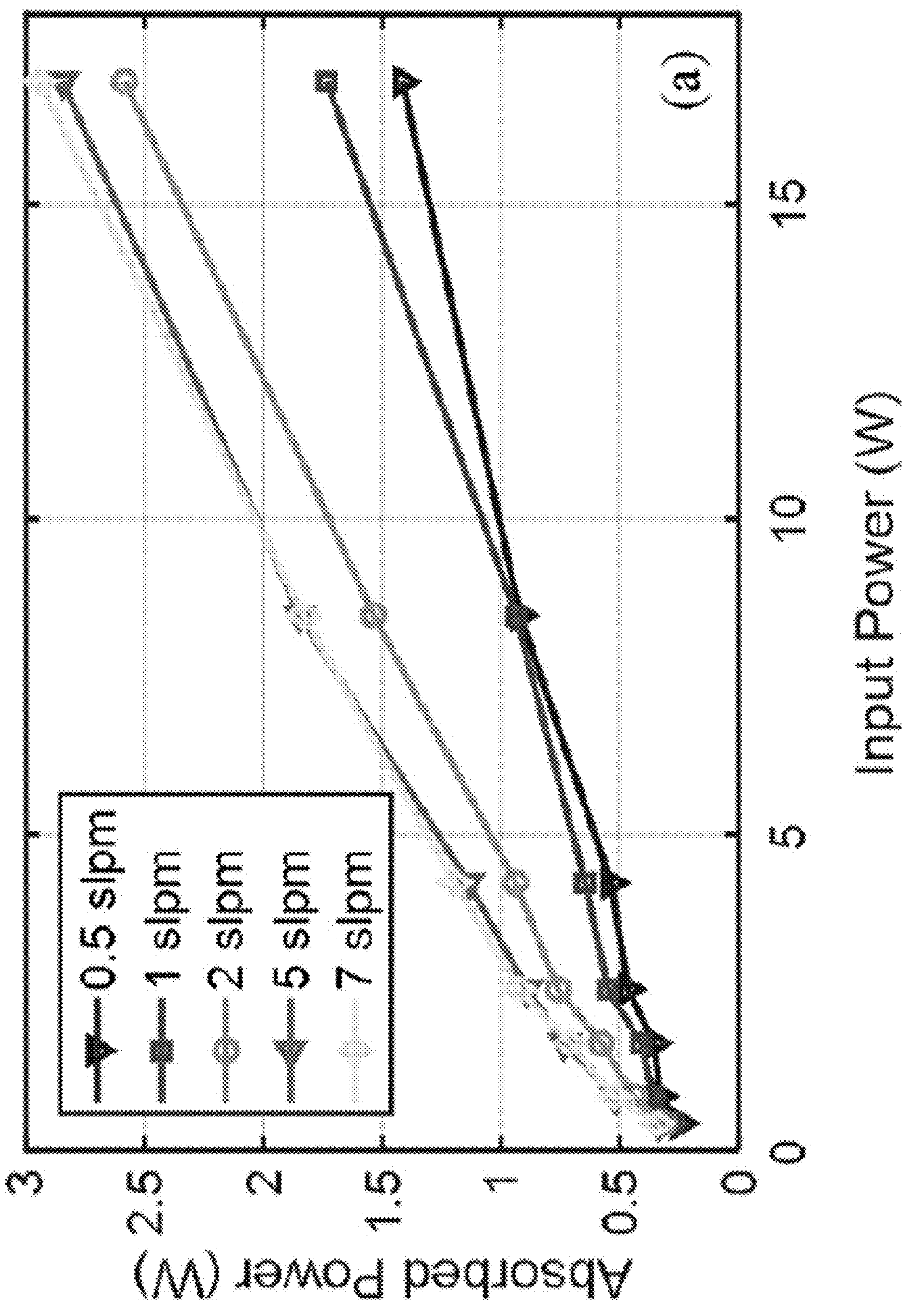
FIGS. 12A-12B: Graph showing measured plasma absorbed power (FIG. 12A) and graph showing power efficiency (FIG. 12B) of the EVA cavity plasma jet for different input powers and helium flow rates.

The designed EVA cavity plasma jet has an excellent OFF-mode reflection performance, as depicted in FIG. 8. The plasma absorbed power can be calculated as the difference between the input and reflected powers. Using a bidirectional coupler and two power sensors, as shown in FIG. 7, it is possible to accurately measure the input and reflected powers at the device's port. FIG. 12A displays the absorbed power for different input powers and gas flow rates. It is seen that the plasma absorbs more power in higher gas flow rates. Plasma power efficiency is the ratio of the absorbed power to the input power available to the EVA cavity jet, which is plotted in FIG. 12B. It is noted that power efficiency significantly increases in lower input power values and is also enhanced considerably by gas flow rates. With 0.5 W of input power at a helium gas flow rate of 7 slpm, about 80% of the input microwave power is absorbed by the plasma, showing a high-efficiency plasma jet generation. The decrease in power efficiency by increasing input power is due to the reduction of the resonator quality factor. By plasma ignition in the critical gap area, the resonator gap capacitor ($C_{gap}$) becomes lossy because of plasma conductivity. The higher the input power, the higher plasma electron density, which eventuates higher loss and lowest quality factor. Desirably, the EVA cavity plasma jet has shown to have improved efficiency with respect to the input power, jet length, and gas flow rate when compared to conventional methods and technologies.

Diagnostics of the Eva Plasma Jet

Various optical diagnostics techniques were performed on atmospheric pressure microwave plasma jets (APPJs) based on the parameters to be measured. Electron density is one of the crucial parameters for different applications. Thomson scattering is an active spectroscopy method, allowing simultaneous electron density and temperature determination with high spectral resolution. While this method is widely used in high-density plasma characterization, it is expensive for low-density plasmas since a triple grating monochromator must be used to subtract the Rayleigh scattering component and stray light. Optical Emission Spectrometry (OES) is a passive spectroscopy method in which electron density is obtained by analyzing spectral line shapes and intensities. Two of the most commonly used broadening profiles to assess $n_e$ are spectral line emissions of the hydrogen atom, namely Balmer-alpha (H-α) at 656.279 nm and Balmer-beta (H-β) at 486.135 nm, because of their position in the visible spectral region and linear Stark effect.

In atmospheric pressure plasmas, a spectral profile is a convolution of Gaussian and Lorentzian profiles, known as the Voigt function. The Gaussian component of the obtained spectral profile depends on the mass of the hydrogen atoms, central wavelength, and gas temperature. The Lorentzian component of the Voigt profile, which dominates the spectral profile, consists of Doppler, Resonance, van der Waals, and Stark broadenings. The Resonance broadening occurs when perturbations of atomic levels are caused due to interaction between pairs of neutral atoms of the same kind, for example, (He+He). This broadening is negligible for hydrogen Balmer lines at atmospheric pressure and can be excluded. Thus, Doppler and van der Waals broadenings are considered for proper electron density estimation. When the emitting atoms have random motion, it introduces the Doppler effect, resulting in the broadening of atomic transitions, known as Doppler broadening. The full width at half maximum (FWHM) for Doppler broadening can be given as $$\Delta\lambda_D = \lambda_0\left(8\ln 2\frac{k_B T_g}{m_a c^2}\right) \tag{6}$$

where the gas temperature $T_g$ is in Kelvin, Boltzmann's constant $k_b$ is in $JK^{-1}$, and $m_a$ is the mass of the emitter. On the other hand, van der Waals broadening occurs when perturbations of atomic levels are caused due to interaction between different species, for example, (H+He). The FWHM of van der Waals broadening can be represented as $$\Delta\lambda_{vdw} = \frac{C}{T_g^{0.7}} \tag{7}$$

where the constant C depends on the gas type and is equal to 2.42 and 5.12 for helium and argon, respectively.

Figure 15:
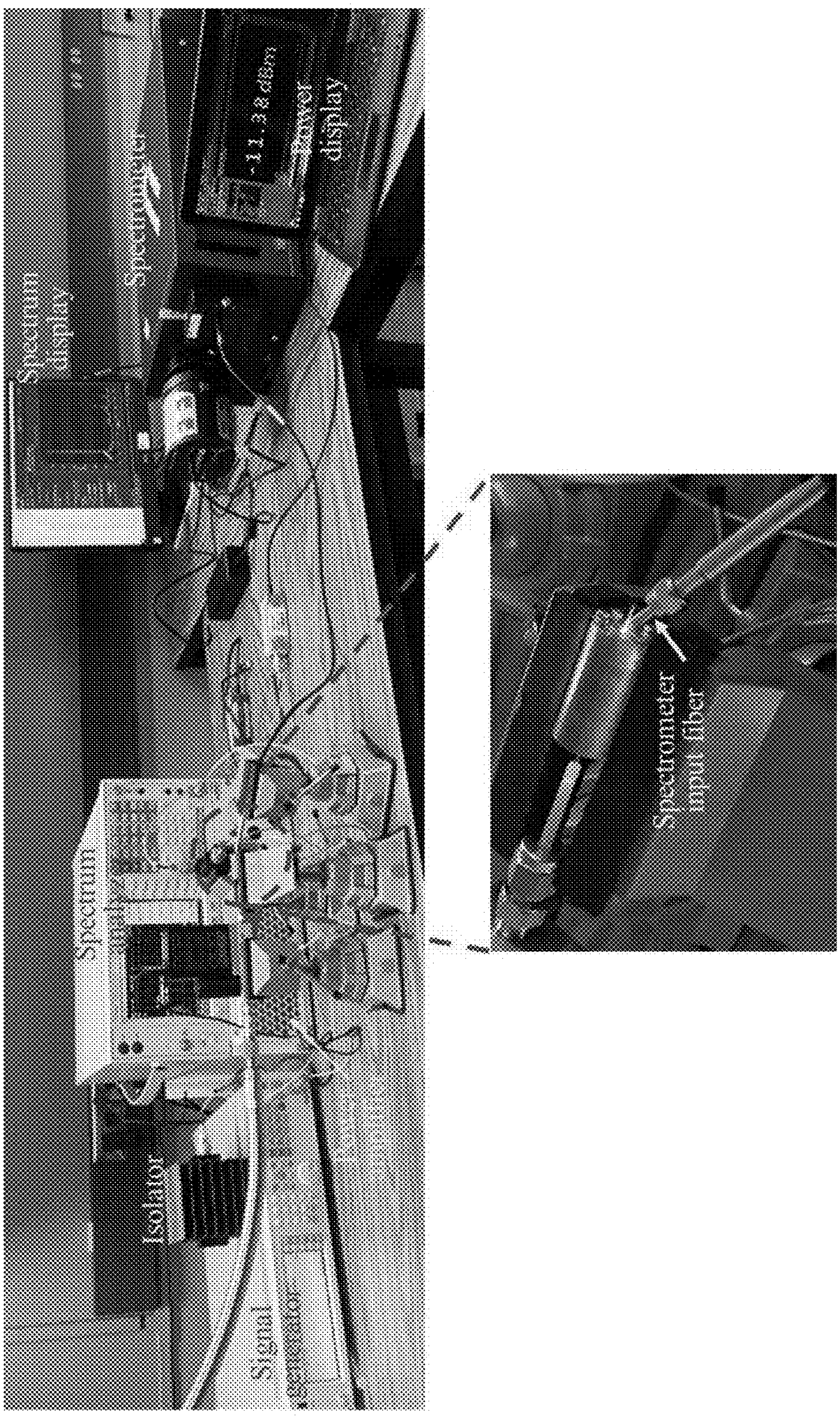
FIG. 15: Photographs of EVA microwave plasma jet measurement and diagnostics set up with the main device zoomed in. A 2.45 GHz signal is generated by a signal generator and amplified by a power amplifier, gas flow to the EVA cavity resonator is provided through a capillary tube, and the jet's light is fed into the spectrometer by a fiber optic probe.
Figure 16A:
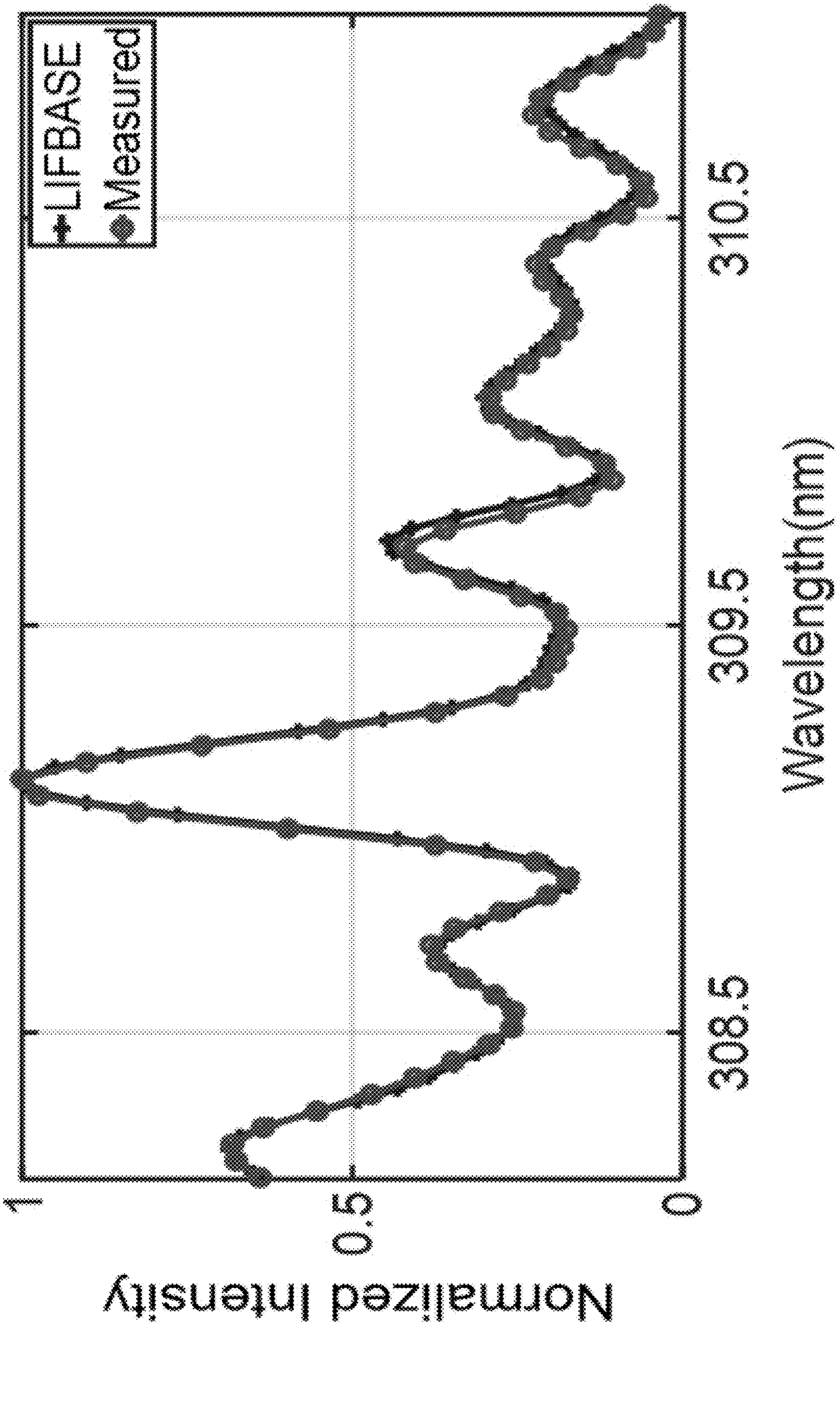
FIG. 16A: Graph showing normalized OH spectrum fit at 309 nm for input power of 10 W with extracted $T_g$=350 K.
Figure 16B:
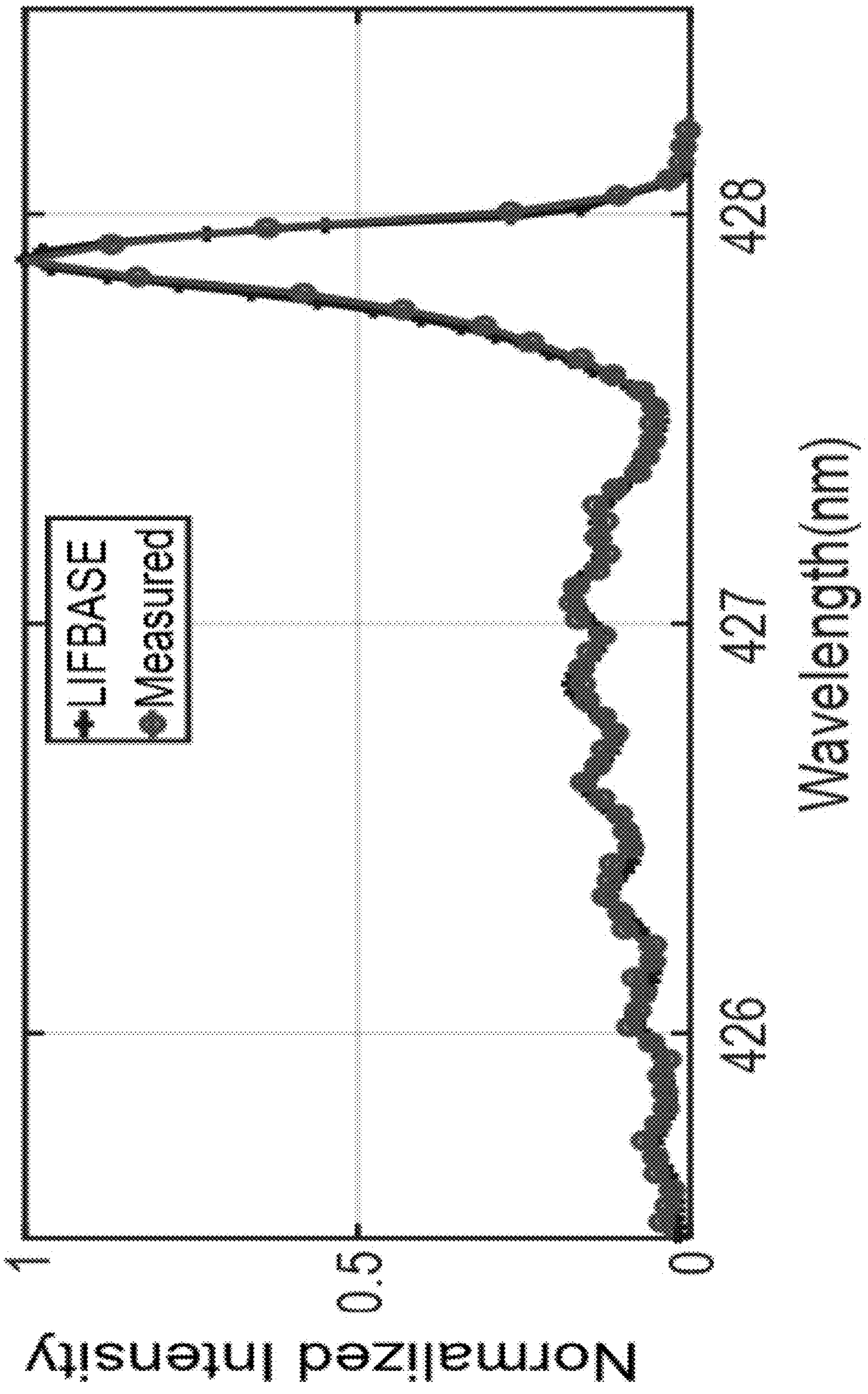
FIG. 16B: Graph showing normalized $N_{2+}$ spectrum fit at 428 nm for input power of 500 mW with extracted $T_g$=296 K.

To estimate van der Waals and Doppler broadening, the knowledge of gas temperature is important. In nonthermal plasmas, the rotational temperature of diatomic molecules, mostly OH and $N_2$+, give a close approximation of gas temperature, and this is a widely used method with great success. The spectral profiles are measured utilizing an OES technique using a Teledyne Princeton Instruments HRS-500-SS spectrometer with 0.05 nm optical resolution. FIG. 15 exhibits the plasma jet generation and diagnostics setup. As the zoomed-in view shows, the optical fiber is placed closely toward the plasma jet to collect as much light as possible to get a distinctive spectral line for different operating conditions. This disclosure uses transition lines of both OH (308-312 nm) and $N_2$+ (426-428.5 nm) for cross-referencing the values. The experimental profiles are then compared with spectral profiles available in LIFBASE software, as displayed in FIGS. 16A-16B, LIFBASE is a software that contains the spectral database of diatomic molecules. As both $N_2$+ and OH spectra were measured through OES, the rotational temperatures for all input powers were extracted by comparing the measured spectrum with the LIFBASE generated spectrum for that particular diatomic molecule.

TABLE 2

Measured gas temperatures and extracted various spectrum broadenings of the 2.45 GHz EVA plasma jet at various input powers and helium flow rate of 7 slpm

| Input Power | 0.5 W | 1 W | 5 W | 10 W |
|---|---|---|---|---|
| $T_g$ (K) | 296 | 333 | 340 | 350 |
| $\Delta\lambda_{Stark}$ (nm) | 0.1952 | 0.198 | 0.1946 | 0.1946 |
| $\Delta\lambda_D$ (nm) | 0.0087 | 0.0067 | 0.006 | 0.0068 |
| $\Delta\lambda_{vdw}$ (nm) | 0.0451 | 0.0415 | 0.0409 | 0.0401 |

Figure 17:
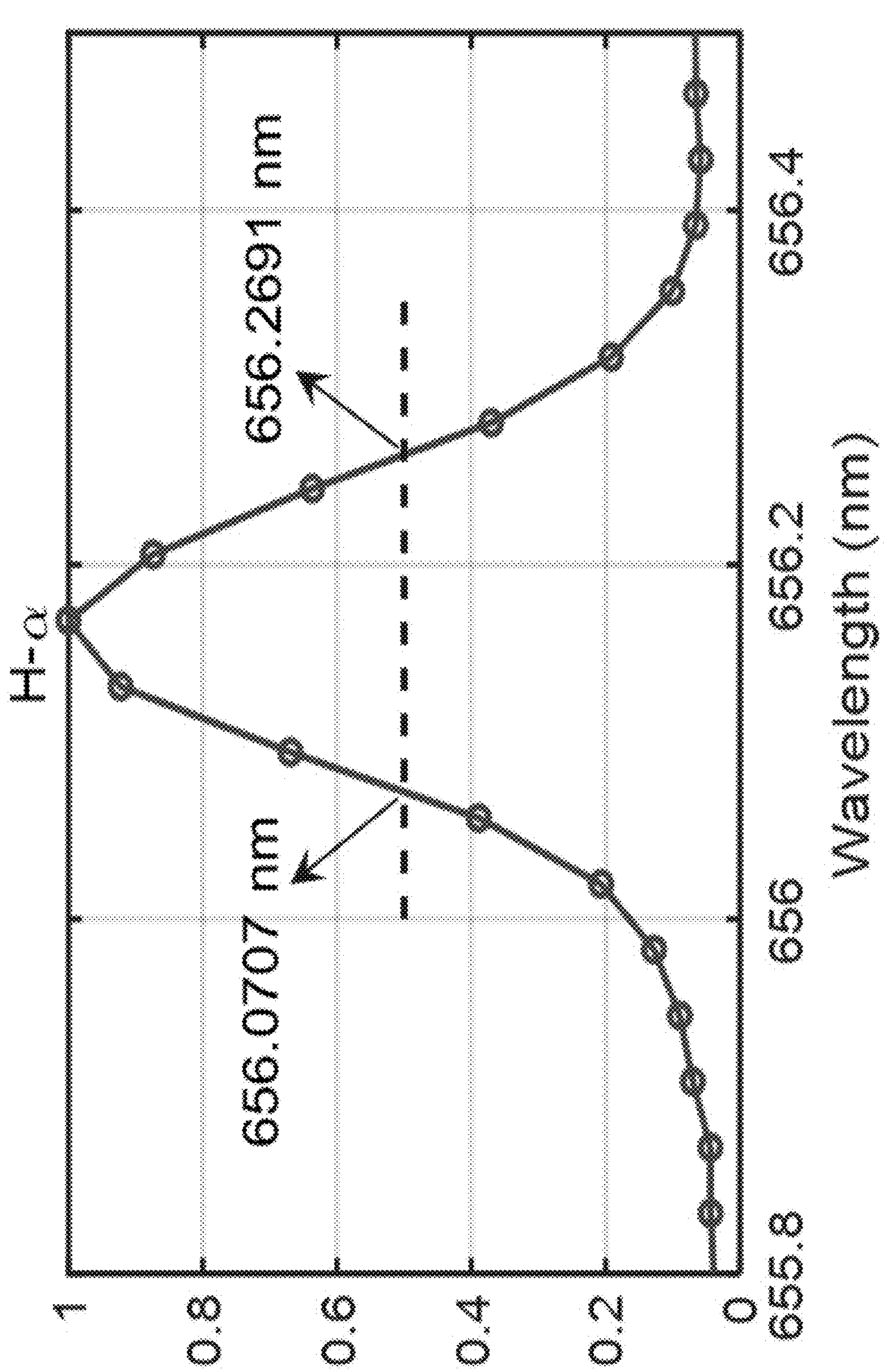
FIG. 17: Graph showing normalized H-α line at 1 W of 2.45 GHz input power and 7 slpm helium flow rate. FWHM is indicated for reading the $\Delta\lambda_S^A$, which is required to extract the jet electron density.

As seen in Table 2, the gas temperature increases from 296 (ambient) to 350 K for the change of input power from 500 mW to 10 W. All measured temperatures are with the accuracy of ±5 K. This temperature range proves this device as a safe option for many applications sensitive to high temperature. Upon measuring $T_g$, the Doppler and van der Waals broadenings are calculated using (6) and (7), respectively. Comparing the values in Table 2, it is evident that the van der Waals and the Doppler broadenings are minimal, and the Stark broadening is mostly dominant, making its FWHM suitable to measure $n_e$. Hence, this disclosure presents measurements of the electron density in the introduced EVA plasma jet using the OES Stark broadening technique. In this study, the H-α profile was opted for calculating $n_e$ as it is more distinct than the H-β for the EVA jet device. FIG. 17 displays a sample normalized H-α profile recorded at 1 W input power and 7 slpm of helium flow rate. Such a profile is then used to extract FWHM of spectral broadening, represented by $\Delta\lambda_{Stark}$ in nm, which is directly related to $n_e$ by $$n_e=10^{17}\times(\Delta\lambda_{Stark}/1.098)^{1.47135} \quad (8)$$

where $n_e$ is in $cm^{-3}$.

Figure 12B:
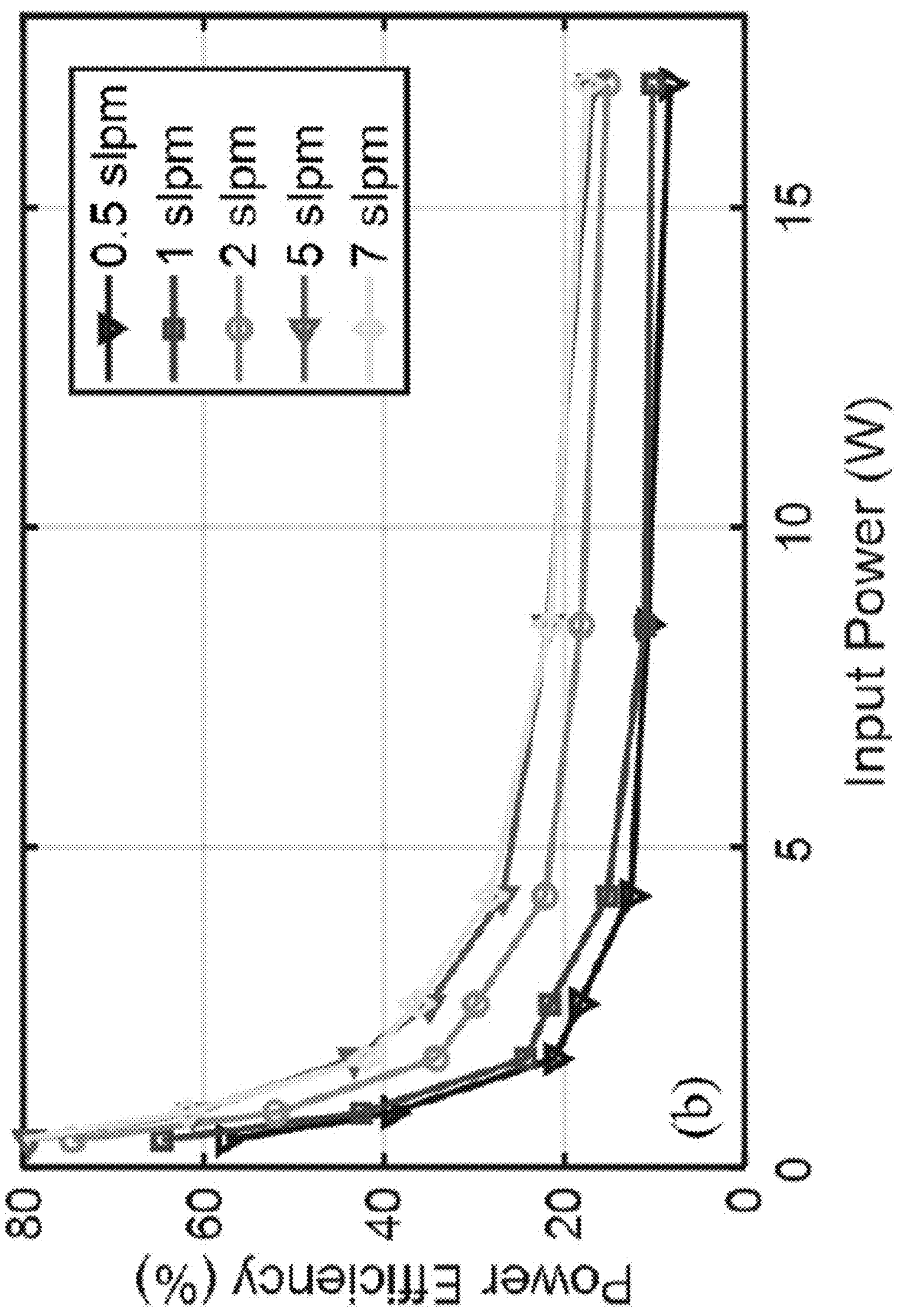
Figure 13:
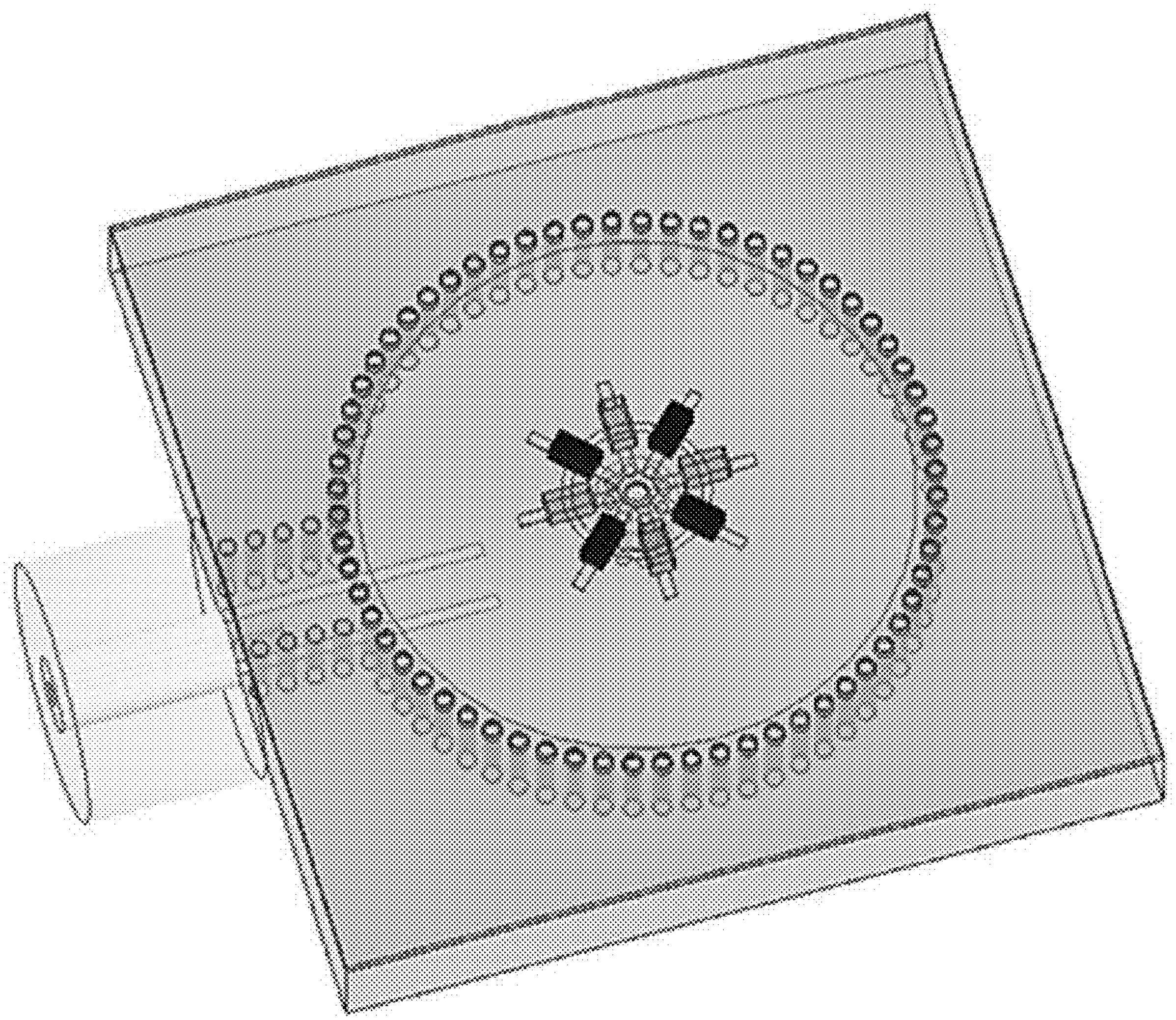
FIG. 13: Illustration of a non-limiting example of the second embodiment of the evanescent mode cavity plasma jet assembly.
Figure 14A:
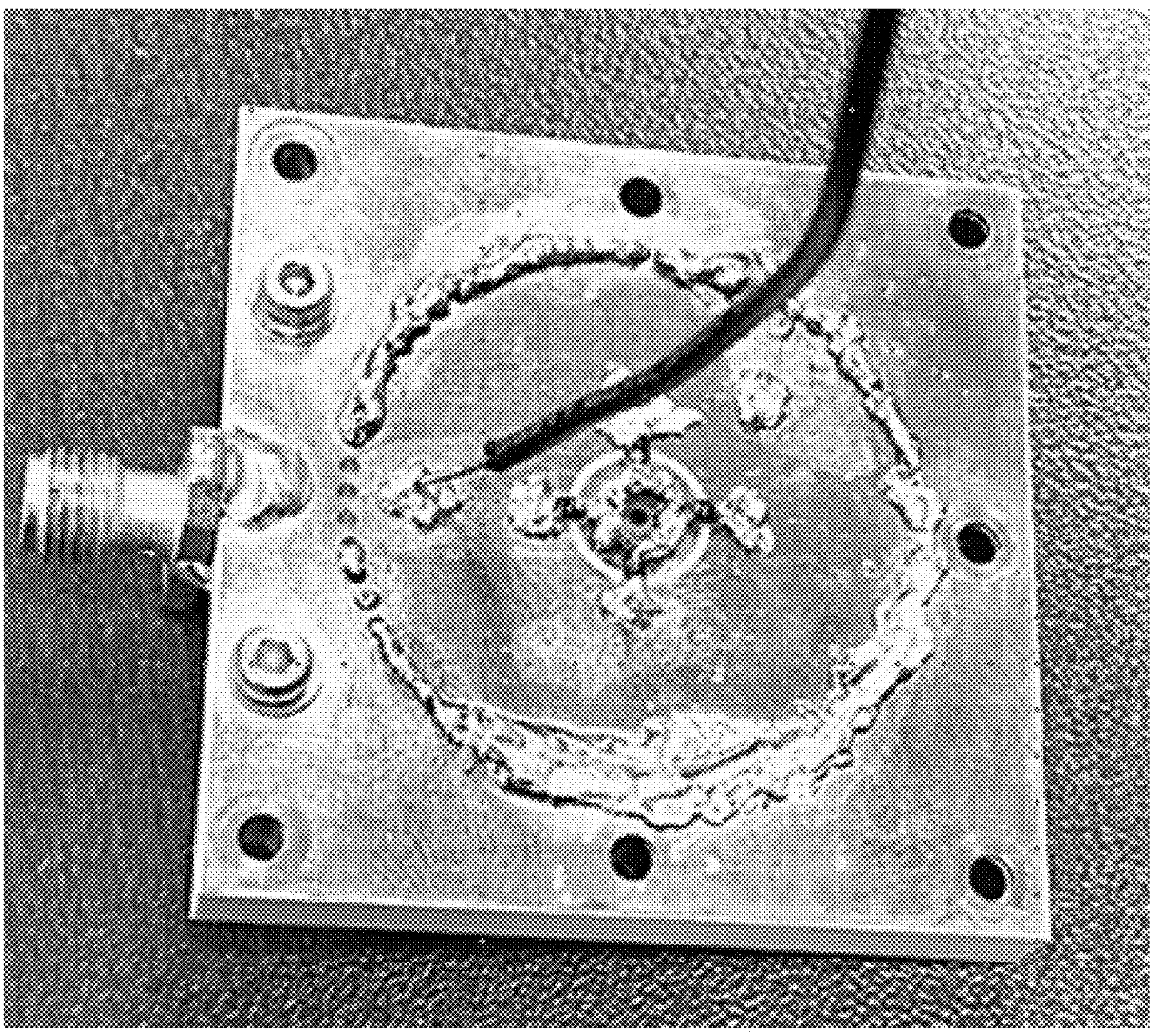
FIGS. 14A-14B: Photographs of a non-limiting example of the second embodiment of the evanescent mode cavity plasma jet assembly.
Figure 14B:
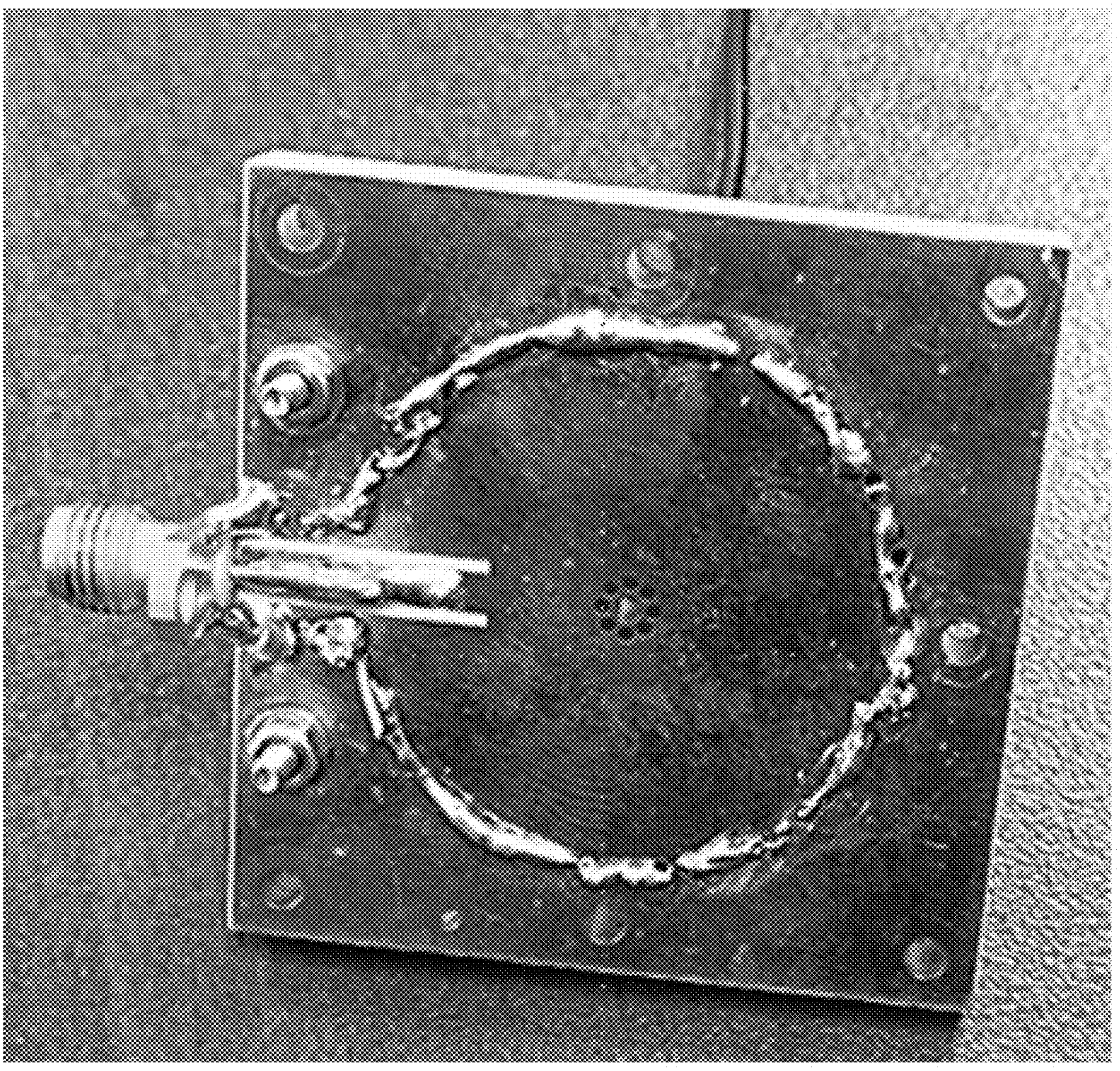
Figure 18:
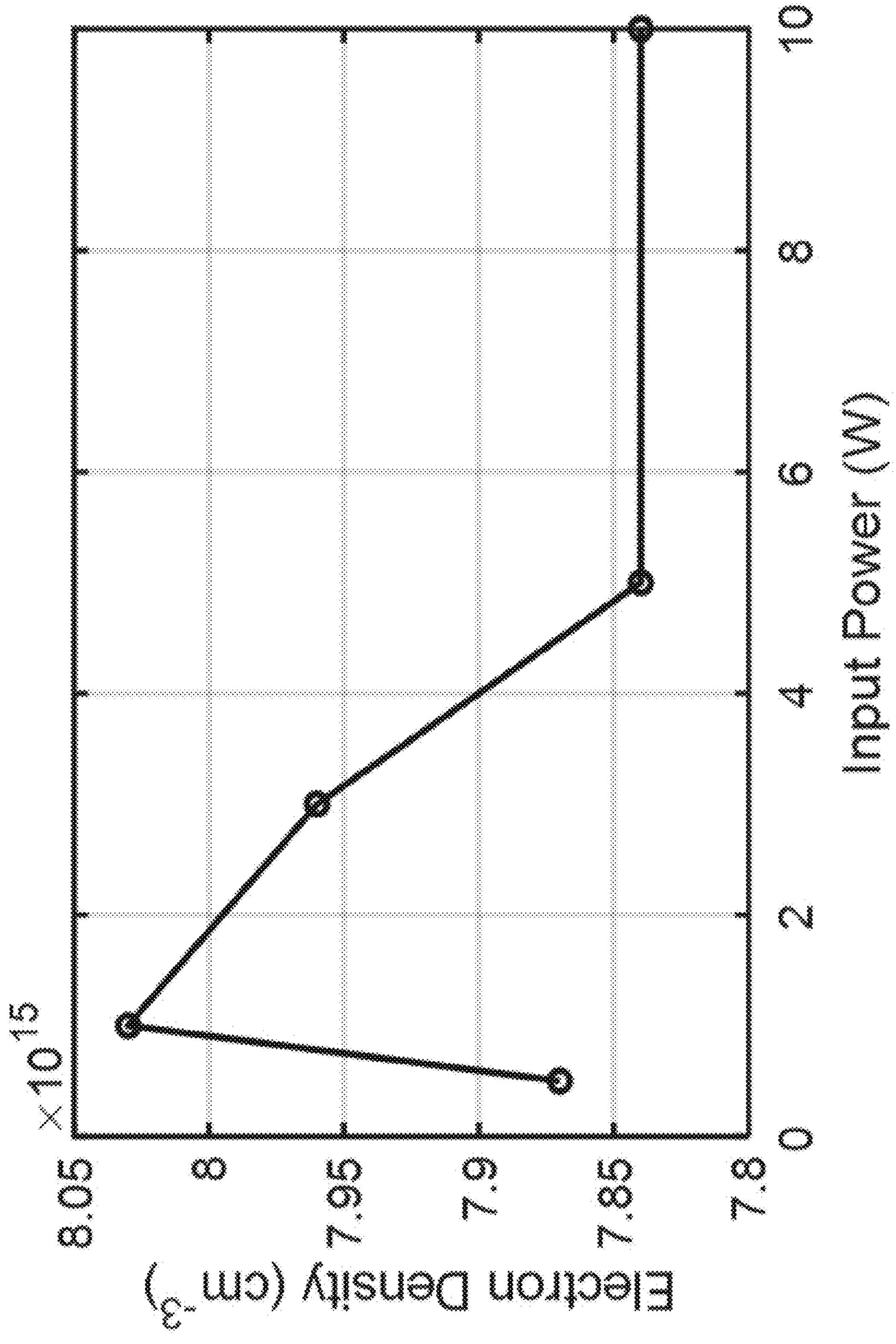
FIG. 18: Graph showing measured electron number density at a helium flow rate of 7 slpm and different values of 2.45 GHz input powers.
Figure 19:
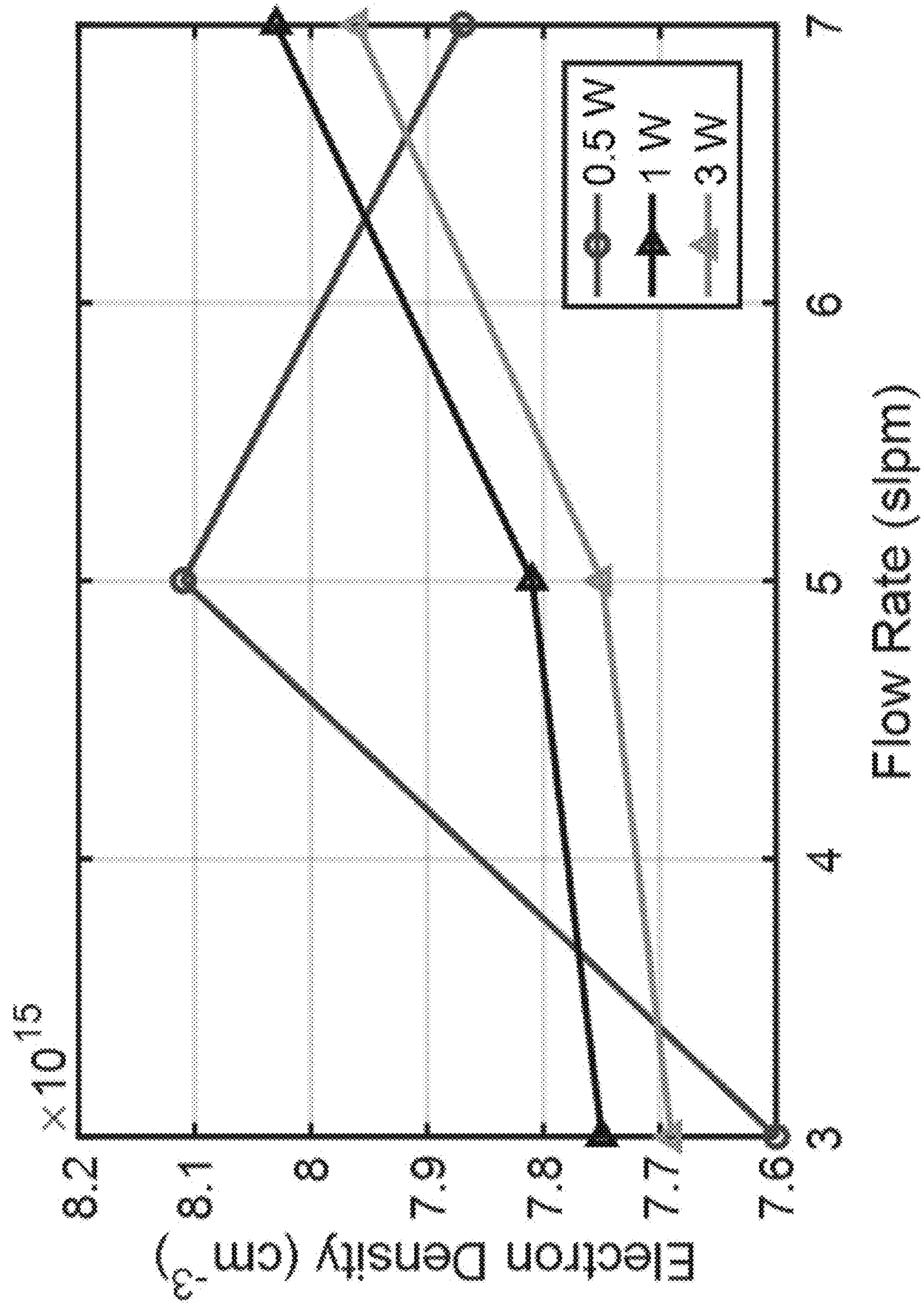
FIG. 19: Graph showing extracted electron density at three flow rates of 3, 5, and 7 slpm and three 2.45 GHz input powers of 0.5, 1, and 3 W.

To investigate the effect of input 2.45 GHz power on the EVA jet electron density, the gas flow rate was kept constant at 7 slpm, and $n_e$ was measured at input powers ranging from 0.5 to 10 W, as seen in FIG. 18. It is observed that electron density is in the range of $8\times10^{15}$ $cm^{-3}$, which is significant considering the input power range. Higher electron density over the lower range of input power is significant and is due to the higher efficiency of this device at lower input powers, as depicted in FIG. 12B. Variation of electron density by gas flow rate (ranging from 3 to 7 slpm) for different input power values (0.5, 1, and 3 W) is represented in FIG. 19. Again, it is observed that the electron density of the EVA plasma jet remains almost constant around $8\times10^{15}$ $cm^{-3}$. This is because the jet absorbed power increases slightly by input power and gas flow rate as the power efficiency decreases, as depicted in FIGS. 12A-12B. Practically, it is a big advantage to have such a strong plasma jet even with 100's of milliwatts input power and flow rate of just a few slpm, as it makes the device very safe for a variety of applications. It is seen that overall, this new device provides great performance. Notably, it has higher electron density compared with similar low-power-consumption jets and higher efficiency compared with higher power devices.

CONCLUSION

A resonant microwave plasma jet technology has been demonstrated in this example. The structure was formed by an EVA cavity resonator with a helium flow going through its critical gap region. Since this is a high-Q resonant structure with an electric field mainly concentrated over that critical gap area, gas breakdown occurs even with low values of input microwave power. The gas flow then pushes the plasma torch out of the resonator in a jet form, where its properties depend on both input power and gas flow rate. A prototype 2.45 GHz EVA plasma jet provided a maximum efficiency of >80%, achieved under low power and high flow rate, with electron density in the range of $10^{15}$ ($cm^{-3}$) and a maximum jet temperature of 350 K at 10 W input power. The results demonstrate the realization of high-density plasma jets with only milliwatts of power by employing high-Q microwave resonant structures. If required, the plasma volume can be extended by either using an array of such jets or scaling the resonator to lower frequencies.

Certain embodiments of the devices and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the devices and methods described herein to various usages and conditions. Various changes may be made, and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A plasma jet assembly comprising:

a cavity resonator;

a metallic material disposed in the cavity resonator;

a radio frequency port configured to receive a radio frequency connector configured to couple electromagnetic energy into the cavity resonator; and a gas channel within the metallic material and configured to direct a flow of a gas (i) to a space adjacent the metallic material where an electric field concentrates upon the coupling of electromagnetic energy from the radio frequency connector, and (ii) in a direction out of the plasma jet assembly.

2. The plasma jet assembly of claim 1, wherein the cavity resonator is defined by an outer perimeter of via-holes formed through a first substrate and a second substrate.

3. The plasma jet assembly of claim 2, wherein the metallic material comprises an inner perimeter of via-holes formed through at least the first substrate within the outer perimeter of via-holes.

4. The plasma jet assembly of claim 3, wherein the gas channel is defined by a central via-hole formed through the first substrate and the second substrate within the inner perimeter of via-holes.

5. The plasma jet assembly of claim 4, wherein an input coupling line of the radio frequency port is disposed adjacent to the inner perimeter of via-holes without touching the inner perimeter of via-holes.

6. The plasma jet assembly of claim 1, wherein the cavity resonator is defined by a base surface and cavity walls of a main body.

7. The plasma jet assembly of claim 6, wherein the metallic material is a metallic post.

8. The plasma jet assembly of claim 7, wherein the radio frequency connector has a radio frequency pin disposed adjacent to the metallic post without touching the metallic post.

9. The plasma jet assembly of claim 8, further comprising a ceiling assembly having an inner surface and outer surface, the inner surface being disposed over the cavity resonator, and the ceiling assembly defining a plasma jet outlet.

10. The plasma jet assembly of claim 9, wherein the space is formed between the metallic post and the ceiling assembly.

11. The plasma jet assembly of claim 10, wherein the space is defined by a recess formed in the inner surface of the ceiling assembly.

12. A plasma jet assembly comprising:

a first substrate;

a second substrate disposed over the first substrate;

an outer perimeter of via-holes formed through the first substrate and the second substrate;

a cavity resonator formed within the outer perimeter of via-holes;

an inner perimeter of via-holes formed through the first substrate and within the outer perimeter of via-holes;

a radio frequency port disposed adjacent to the first substrate and the second substrate, the radio frequency port configured to receive a radio frequency connector configured to couple electromagnetic energy into the cavity resonator; and a central via-hole formed through the first substrate and the second substrate and within the inner perimeter of via-holes, the central via-hole configured to direct a flow of a gas (i) to a space within the inner perimeter of via-holes where an electric field concentrates upon the coupling of electromagnetic energy from the radio frequency connector, and (ii) in a direction through the central via-hole and out of the plasma jet assembly.

13. The plasma jet assembly of claim 12, wherein:

the first substrate defines a top side and a bottom side, and comprises a first microwave laminate; and the second substrate defines a top side and a bottom side, and comprises a second microwave laminate.

14. The plasma jet assembly of claim 13, wherein the space includes a recess formed in the bottom side of the second substrate.

15. The plasma jet assembly of claim 12, wherein the first substrate comprises a plurality of coupling via-holes formed therethrough and extending from the RF port toward the cavity resonator.

16. The plasma jet assembly of claim 12, wherein a gas transport tube is disposed through the central via-hole.

17. A plasma jet assembly comprising:

a cavity resonator defined by a base surface and cavity walls;

a ceiling assembly having an inner surface and an outer surface, the inner surface disposed over the cavity resonator;

a metallic post disposed in the cavity resonator;

a radio frequency port configured to receive a radio frequency connector configured to couple electromagnetic energy into the cavity resonator;

a space formed between the metallic post and the ceiling assembly;

a plasma jet outlet defined by the ceiling assembly; and a gas channel within the metallic post and configured to direct a flow of a gas (i) to the space where an electric field concentrates upon the coupling of electromagnetic energy from the radio frequency connector, and (ii) in a direction through the plasma jet outlet and out of the plasma jet assembly.

18. The plasma jet assembly of claim 17, wherein the space is defined by a recess formed in the inner surface of the ceiling assembly.

19. The plasma jet assembly of claim 17, wherein the radio frequency connector has a radio frequency pin disposed adjacent to the metallic post without touching the metallic post.

20. The plasma jet assembly of claim 17, wherein the metallic post is axially aligned with the gas channel.

* * * * *